US012794531B2

(12) United States Patent
Hu et al.

(10) Patent No.: US 12,794,531 B2
(45) Date of Patent: Nov. 10, 2026

(54) FEEDBACK METHOD, AND APPARATUS FOR RELIABLE CHANNEL STATE INFORMATION (CSI) MEASUREMENT

(71) Applicant: HUAWEI TECHNOLOGIES CO., LTD., Shenzhen (CN)

(72) Inventors: Mengshi Hu, Shenzhen (CN); Xiao Han, Shenzhen (CN); Chenchen Liu, Shenzhen (CN); Rui Du, Shenzhen (CN); Yunbo Li, Shenzhen (CN); Yi Lv, Shenzhen (CN); Xun Yang, Shenzhen (CN)

(73) Assignee: Huawei Technologies Co., LTD., Shenzhen (CN)

(*) Notice: Subject to any disclaimer, the term of this patent is extended or adjusted under 35 U.S.C. 154(b) by 307 days.

(21) Appl. No.: 18/533,873

(22) Filed: Dec. 8, 2023

(65) Prior Publication Data

US 2024/0113758 A1 Apr. 4, 2024

Related U.S. Application Data

(63) Continuation of application No. PCT/CN2022/096193, filed on May 31, 2022.

(30) Foreign Application Priority Data

Jun. 11, 2021 (CN) ........................ 202110653974.X

(51) Int. Cl.
*H04B 7/06* (2006.01)

(52) U.S. Cl.
CPC ........... *H04B 7/0626* (2013.01); *H04B 7/063* (2013.01); *H04B 7/0636* (2013.01)

(58) Field of Classification Search
CPC ..... H04W 72/21; H04W 28/10; H04W 4/005; H04W 4/70; H04W 72/51; H04W 72/541;
(Continued)

(56) References Cited

U.S. PATENT DOCUMENTS

2007/0129018 A1* 6/2007 Trainin ............. H04L 25/03343 455/69
2017/0070914 A1* 3/2017 Chun ...................... H04W 4/70
(Continued)

FOREIGN PATENT DOCUMENTS

CN 110138421 A 8/2019
CN 112448743 A 3/2021
(Continued)

OTHER PUBLICATIONS

International Search Report and Written Opinion in International Appln. No. PCT/CN2022/096193, mailed on Jul. 26, 2022, 17 pages (with English translation).
(Continued)

*Primary Examiner* — Rushil P. Sampat
(74) *Attorney, Agent, or Firm* — Fish & Richardson P.C.

(57) ABSTRACT

The present disclosure relates to feedback methods and apparatuses. In one example method, a first communication apparatus may receive first information. The first information includes at least one of channel state information (CSI) measurement quantity indication information for channel variation calculation, a CSI type and a rule that are for the channel variation calculation, or a feedback suggestion parameter. The feedback suggestion parameter indicates a suggested feedback form. The first information is used to select a second communication apparatus. The first communication apparatus may determine, based on the first information, whether to trigger the second communication apparatus/apparatuses to send a feedback result. Correspondingly, the first communication apparatus receives the feedback result.

20 Claims, 12 Drawing Sheets

(58) Field of Classification Search
CPC .... H04W 84/12; H04W 88/08; H04L 1/0025; H04L 1/0026; H04L 1/0075; H04L 1/0618; H04L 5/0023; H04L 5/0053; H04L 5/0007; H04L 5/0055; H04B 7/0626; H04B 7/063; H04B 7/0639
See application file for complete search history.

(56) References Cited

U.S. PATENT DOCUMENTS

| | | | | |
|---|---|---|---|---|
| 2018/0309605 | A1 | 10/2018 | Liu et al. | |
| 2018/0317128 | A1* | 11/2018 | Chun | H04L 5/0055 |
| 2019/0253184 | A1 | 8/2019 | Xing | |
| 2023/0371076 | A1* | 11/2023 | Lu | H04W 74/0816 |

FOREIGN PATENT DOCUMENTS

| | | | |
|---|---|---|---|
| CN | 112512082 | A | 3/2021 |
| WO | 2021023093 | A1 | 2/2021 |
| WO | 2021030685 | A1 | 2/2021 |

OTHER PUBLICATIONS

Liu et al., "Follow-ups on Channel Measurement Procedure for WLAN Sensing," IEEE 802.11-20/xxxxr0, Jun. 13, 2020, 16 pages.
Da Silva et al., "A Channel Measurement Procedure for WLAN Sensing," IEEE 802.11-20/0842r0, Jun. 3, 2020, 15 pages.
Liu et al., "EHT NDPA Frame Design Discussion," IEEE 802.11-20/1015r0, Jul. 7, 2020, 25 pages.
Office Action in Japanese Appln. No. 2023-575808, mailed on Nov. 12, 2024, 7 pages (with English translation).
Hu et al., "Threshold Based Sensing Measurement," IEEE 802.11-21/0351r5, May 10, 2021, 19 pages.
Extended European Search Report in European Appln. No. 22819411.4, mailed on Oct. 15, 2024, 13 pages.
Office Action in Japanese Appln. No. 2023-575808, mailed on Apr. 1, 2025, 8 pages (with English translation).
Office Action in Australian Appln. No. 2022291191, mailed on Aug. 29, 2024, 3 pages.
Chen et al., "Overview of WLAN sensing protocol," IEEE 802.11-20/1232r0, Aug. 16, 2020, 11 pages.
Office Action in Indian Appln. No. 202317086908, mailed on Apr. 15, 2026, 8 pages (with English translation).
Office Action in Korean Appln. No. 2024-7000526, mailed on May 18, 2026, 12 pages (with English translation).

* cited by examiner

| | Channel variation | Channel state information CSI bitmap | Whether more times of measurement are required | Feedback type | Whether to further feed back | Channel variation degree |
|---|---|---|---|---|---|---|
| Bit bit | 1 | 3 | 1 | 1 | 1 | 3 |

FEEDBACK METHOD, AND APPARATUS FOR RELIABLE CHANNEL STATE INFORMATION (CSI) MEASUREMENT

CROSS-REFERENCE TO RELATED APPLICATIONS

This application is a continuation of International Application No. PCT/CN2022/096193, filed on May 31, 2022, which claims priority to Chinese Patent Application No. 202110653974.X, filed on Jun. 11, 2021. The disclosures of the aforementioned applications are hereby incorporated by reference in their entireties.

TECHNICAL FIELD

This application relates to the field of wireless communication technologies, and in particular, to a feedback method and an apparatus.

BACKGROUND

During channel measurement, in a measurement phase, a sensing transmitter (sensing transmitter) sends a null data packet announcement (null data packet announcement, NDPA) and a null data packet (null data packet, NDP) to indicate one or more sensing receivers (sensing receiver) to perform channel measurement. In a reporting phase, the sensing transmitter requests to feed back a channel variation, and the sensing receiver sends information about whether the channel variation meets a preset condition. The sensing transmitter triggers a sensing receiver whose channel variation meets the preset condition to feed back a channel measurement result. Correspondingly, the sensing receiver feeds back the channel measurement result.

In the channel measurement and feedback procedure, because the sensing receiver feeds back only a result of whether the channel variation meets the preset condition, reliability of feeding back the result of whether the channel variation meets the preset condition is low. As a result, the sensing transmitter cannot accurately determine whether to trigger a feedback result. This reduces accuracy of channel measurement.

SUMMARY

This application provides a feedback method and an apparatus, to improve accuracy of channel measurement.

According to a first aspect, a feedback method is provided. The method may be implemented through interaction between a first communication apparatus and a second communication apparatus. The first communication apparatus may be an access point (access point, AP), and the second communication apparatus may be a station (station, STA). This is merely an example for description herein, and specific types of the first communication apparatus and the second communication apparatus are not specifically limited.

The first communication apparatus receives a first physical protocol data unit (physical protocol data unit, PPDU), where the first PPDU includes first information, and the first information includes at least one of the following types of information: channel state information (channel state information, CSI) measurement quantity indication information required for channel variation calculation, a CSI type for the channel variation calculation, information about a rule for the channel variation calculation, or a feedback suggestion parameter, where the feedback suggestion parameter indicates a suggested feedback form. It may be understood that, in this step, the first communication apparatus may receive one first PPDU or first PPDUs sent by one or more second communication apparatuses. First information in the first PPDUs sent by the second communication apparatuses may be the same or different. The first information is used to determine whether to trigger the second communication apparatus to send a feedback result.

The first communication apparatus may determine, based on the first information, whether to trigger the second communication apparatus to send the feedback result. Herein, the first communication apparatus may selectively trigger, based on the first information, a second communication apparatus that sends the first PPDU. That is, the first communication apparatus selects the second communication apparatus that sends the feedback result. In other words, in the solution provided in this application, the first communication apparatus no longer determines whether to trigger the second communication apparatus to feed back a result based only on a result of whether the channel variation calculated by the second communication apparatus meets the preset condition, but further determines, based on the first information, whether a second communication apparatus sends the feedback result, and selects the second communication apparatus that sends the feedback result, to improve decision-making accuracy. In this application, a second communication apparatus whose calculated channel variation meets the preset condition may be triggered, and a second communication apparatus whose calculated channel variation does not meet the preset condition may also be triggered. This is not limited herein.

Further, if the first communication apparatus determines to trigger the second communication apparatus to send the feedback result, the first communication apparatus may send a third PPDU, where the third PPDU is used to trigger the second communication apparatus to send the feedback result.

The first communication apparatus may further receive the feedback result. The feedback result is sent by the triggered second communication apparatus.

In the method, the first information is used to select a second communication apparatus that sends the feedback result. Compared with a case in which whether to trigger the second communication apparatus is determined based only on whether the channel variation meets the preset condition, the first communication apparatus may more accurately determine, based on the received first information, a second communication apparatus/second communication apparatuses to be triggered, and a triggered second communication apparatus/triggered second communication apparatuses sends/send the feedback result. In this way, accuracy of channel measurement can be improved.

In a possible design, whether the channel variation meets the preset condition may be determined by whether the channel variation exceeds a specified variation threshold. For example, if the channel variation exceeds the specified variation threshold, it is determined that the channel variation meets the preset condition; or if the channel variation does not exceed the specified variation threshold, it is determined that the channel variation does not meet the preset condition.

In a possible design, the first PPDU may further include second information, and the second information indicates whether a channel variation exceeds a specified variation threshold.

Optionally, the first communication apparatus may select, based on the first information and the second information, a second communication apparatus that sends the feedback result. For example, the first communication apparatus may first determine second communication apparatuses whose channel variations exceed the specified variation threshold, and then further selects, from the second communication apparatuses based on the first information, a second communication apparatus that sends the feedback result. For another example, the first communication apparatus may first determine second communication apparatuses whose channel variations do not exceed the specified variation threshold, and then further selects, from the second communication apparatuses based on the first information, a second communication apparatus that sends the feedback result.

Optionally, the first PPDU may carry a feedback response (feedback response) frame, and the feedback response frame includes a result indicating whether the channel variation exceeds the specified variation threshold.

If the second communication apparatus sends the first PPDU to the first communication apparatus under an instruction of the first communication apparatus, in a possible design, the first communication apparatus may further send a second PPDU, where the second PPUD includes third information, and the third information is used to request the first information or notify the first information. Herein, the third information in the second PPDU indicates which information is fed back by the second communication apparatus. This improves feedback flexibility.

In a possible design, the third information includes at least one of the following types: the CSI measurement quantity indication information required for the channel variation calculation, the CSI type for the channel variation calculation, the information about the rule for the channel variation calculation, the feedback suggestion parameter, or indication information for clearing CSI.

If the third information is used to request the first information, and the third information includes the CSI measurement quantity indication information required for the channel variation calculation, it indicates that the third information is used to request the second communication apparatus to feed back the CSI measurement quantity indication information required for the channel variation calculation.

If the third information is used to request the first information, and the third information includes the CSI type for the channel variation calculation, it indicates that the third information is used to request the second communication apparatus to feed back the CSI type for the channel variation calculation.

If the third information is used to request the first information, and the third information includes the information about the rule for the channel variation calculation, it indicates that the third information is used to request the second communication apparatus to feed back the information about the rule for the channel variation calculation.

If the third information is used to request the first information, and the third information includes the feedback suggestion parameter, it indicates that the third information is used to request the second communication apparatus to feed back the feedback suggestion parameter.

If the third information is used to notify the first information, and the third information includes the CSI measurement quantity indication information required for the channel variation calculation, it indicates that the third information is used to notify the second communication apparatus to calculate the channel variation based on a quantity indicated by the CSI measurement quantity indication information.

If the third information is used to notify the first information, and the third information includes the CSI type for the channel variation calculation, it indicates that the third information is used to notify the second communication apparatus to calculate the channel variation by using the CSI type.

If the third information is used to notify the first information, and the third information includes the information about the rule for the channel variation calculation, it indicates that the third information is used to notify the second communication apparatus to calculate the channel variation according to the rule.

If the third information is used to notify the first information, and the third information includes the feedback suggestion parameter, it indicates that the third information is used to notify the second communication apparatus to feed back the feedback suggestion parameter.

If the third information is used to notify the first information, and the third information includes the indication information for clearing CSI, the third information is used to notify the second communication apparatus to clear stored CSI.

It should be noted that the foregoing is merely an example. If the third information includes a plurality of types of information in the CSI measurement quantity indication information required for the channel variation calculation, the CSI type for the channel variation calculation, the information about the rule for the channel variation calculation, the feedback suggestion parameter, and the indication information for clearing CSI, a corresponding meaning of the third information may be obtained based on a meaning of the information shown in the foregoing example. Details are not described herein again.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a media access control (media access control, MAC) frame of the first PPDU, that is, a data field of the first PPDU includes a MAC frame, and the MAC frame includes the first information; or the first information is carried in a physical layer (physical layer, PHY) preamble of the first PPDU.

According to a second aspect, a feedback method is provided. The method may be implemented through interaction between a first communication apparatus and a second communication apparatus. The first communication apparatus may be an AP, and the second communication apparatus may be a STA. This is merely an example for description herein, and specific types of the first communication apparatus and the second communication apparatus are not specifically limited.

The second communication apparatus may generate a first PPDU, where the first PPDU includes first information, and the first information includes at least one of the following types of information: CSI measurement quantity indication information required for channel variation calculation, a CSI type for the channel variation calculation, information about a rule for the channel variation calculation, or a feedback suggestion parameter, where the feedback suggestion parameter indicates a suggested feedback form.

The second communication apparatus sends the first PPDU.

In this step, the second communication apparatus may actively send the first PPDU to the first communication apparatus, or may send the first PPDU to the first communication apparatus under an instruction of the first communication apparatus.

The second communication apparatus that sends the first PPDU may be triggered to feed back, or may not be triggered to feed back. Optionally, the second communication apparatus may receive a third PPDU, where the third PPDU is used to trigger the second communication apparatus to send the feedback result.

The second communication apparatus determines that the second communication apparatus is triggered, and the triggered second communication apparatus may send the feedback result.

In a possible design, the first PPDU may further include second information, and the second information indicates whether a channel variation exceeds a specified variation threshold.

If the second communication apparatus sends the first PPDU to the first communication apparatus under an instruction of the first communication apparatus, in a possible design, the second communication apparatus may further receive a second PPDU, where the second PPUD includes third information, and the third information is used to request the first information or notify the first information.

In a possible design, the third information includes at least one of the following types: the CSI measurement quantity indication information required for the channel variation calculation, the CSI type for the channel variation calculation, the information about the rule for the channel variation calculation, the feedback suggestion parameter, or indication information for clearing CSI.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a MAC frame of the first PPDU, or the first information is carried in a PHY preamble of the first PPDU.

According to a third aspect, a feedback method is provided. The method may be implemented through interaction between a first communication apparatus and a second communication apparatus. The first communication apparatus may be an AP, and the second communication apparatus may be a STA. This is merely an example for description herein, and specific types of the first communication apparatus and the second communication apparatus are not specifically limited.

The first communication apparatus generates a second PPDU, where the second PPDU includes third information, and the third information is used to request first information or notify the first information. The third information may include but is not limited to at least one of the following types of information: CSI measurement quantity indication information required for channel variation calculation, a CSI type for the channel variation calculation, information about a rule for the channel variation calculation, a feedback suggestion parameter, or indication information for clearing CSI.

The first communication apparatus sends the second PPDU. If the third information is used to request the first information, for example, the third information includes the CSI type for the channel variation calculation, it indicates that the second communication apparatus is requested to feed back whether CSI of a specific type participates in a process of calculating a channel variation. In this way, the first communication apparatus may selectively trigger, based on the first information fed back by the second communication apparatus, the second communication apparatus that sends the first information, to improve decision-making accuracy.

If the third information is used to notify the first information, for example, the third information includes the CSI type for the channel variation calculation, it indicates that the second communication apparatus is notified to use CSI of a specific type to participate in a process of calculating the channel variation. This is equivalent to notifying the second communication apparatus to calculate an input parameter for the channel variation calculation, thereby further affecting the channel variation calculated by the second communication apparatus. The first communication apparatus may more accurately determine, at the channel variation, whether to trigger the second communication apparatus to send a feedback result.

Based on the foregoing technical solution, the first information that needs to be fed back by the second communication apparatus is requested or the second communication apparatus is notified of the first information that needs to be used to calculate the channel variation, so that the first communication apparatus can more accurately determine whether to trigger the second communication apparatus to send the feedback result.

Optionally, the first communication apparatus may receive a first PPDU, and the first PPDU includes the first information. The first information includes but is not limited to at least one of the following types of information: the CSI measurement quantity indication information required for the channel variation calculation, the CSI type for the channel variation calculation, the information about the rule for the channel variation calculation, or the feedback suggestion parameter.

The first communication apparatus may determine, based on the first PPDU, whether to trigger the second communication apparatus to send the feedback result.

Optionally, the first communication apparatus may further send a third PPDU, where the third PPDU is used to trigger the second communication apparatus to send the feedback result, and the first communication apparatus receives the feedback result sent by the second communication apparatus.

In a possible design, the first PPDU may further include second information, and the second information indicates whether a channel variation exceeds a specified variation threshold.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a MAC frame of the first PPDU, or the first information is carried in a PHY preamble of the first PPDU.

According to a fourth aspect, a feedback method is provided. The method may be implemented through interaction between a first communication apparatus and a second communication apparatus. The first communication apparatus may be an AP, and the second communication apparatus may be a STA. This is merely an example for description herein, and specific types of the first communication apparatus and the second communication apparatus are not specifically limited.

The second communication apparatus receives a second PPDU, where the second PPDU includes third information, and the third information is used to request first information or notify the first information. The third information may include but is not limited to at least one of the following types of information: CSI measurement quantity indication information required for channel variation calculation, a CSI type for the channel variation calculation, information about a rule for the channel variation calculation, a feedback suggestion parameter, or indication information for clearing CSI.

The second communication apparatus may calculate a channel variation based on the third information.

Optionally, the second communication apparatus may send a first PPDU, and the first PPDU includes the first information. The first information includes but is not limited to at least one of the following types of information: the CSI measurement quantity indication information required for the channel variation calculation, the CSI type for the channel variation calculation, the information about the rule for the channel variation calculation, or the feedback suggestion parameter.

Optionally, the second communication apparatus may further receive a third PPDU, where the third PPDU is used to trigger the second communication apparatus to send a feedback result, and the second communication apparatus sends the feedback result.

In a possible design, the first PPDU may further include second information, and the second information indicates whether a channel variation exceeds a specified variation threshold.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a MAC frame of the first PPDU, or the first information is carried in a PHY preamble of the first PPDU.

According to a fifth aspect, a communication apparatus is provided. The communication apparatus may be the first communication apparatus or the second communication apparatus, or may be a chip disposed in the first communication apparatus or the second communication apparatus. The communication apparatus may implement the method in the first aspect, the second aspect, the third aspect, or the fourth aspect.

When the communication apparatus is the first communication apparatus, optionally, the communication apparatus includes a processing unit and a transceiver unit.

For example, the transceiver unit is configured to receive a first PPDU, where the first PPDU includes first information, and the first information includes at least one of the following types of information: CSI measurement quantity indication information required for channel variation calculation, a CSI type for the channel variation calculation, information about a rule for the channel variation calculation, or a feedback suggestion parameter, where the feedback suggestion parameter indicates a suggested feedback form.

The processing unit is configured to determine, based on the first information, whether to trigger a second communication apparatus to send a feedback result.

In a possible design, the first PPDU further includes second information, and the second information indicates whether a channel variation exceeds a specified variation threshold.

In a possible design, the transceiver unit is further configured to send a second PPDU, where the second PPDU includes third information, and the third information is used to request the first information or notify the first information.

In a possible design, the third information includes at least one of the following types: the CSI measurement quantity indication information required for the channel variation calculation, the CSI type for the channel variation calculation, the information about the rule for the channel variation calculation, the feedback suggestion parameter, or indication information for clearing CSI.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a MAC frame of the first PPDU, or the first information is carried in a PHY preamble of the first PPDU.

When the communication apparatus is the second communication apparatus, the processing unit is configured to generate a first PPDU, where the first PPDU includes first information, and the first information includes at least one of the following types of information: CSI measurement quantity indication information required for channel variation calculation, a CSI type for the channel variation calculation, information about a rule for the channel variation calculation, or a feedback suggestion parameter, where the feedback suggestion parameter indicates a suggested feedback form; and the transceiver unit is configured to send the first PPDU.

In a possible design, the first PPDU further includes second information, and the second information indicates whether a channel variation exceeds a specified variation threshold.

In a possible design, the transceiver unit is further configured to receive a second PPDU, where the second PPDU includes third information, and the third information is used to request the first information or notify the first information.

In a possible design, the third information includes at least one of the following types: the CSI measurement quantity indication information required for the channel variation calculation, the CSI type for the channel variation calculation, the information about the rule for the channel variation calculation, the feedback suggestion parameter, or indication information for clearing CSI.

In a possible design, the CSI measurement quantity indication information required for the channel variation calculation includes at least one of the following types: indication information indicating whether more measurements are required, a total quantity of measurements, or a remaining quantity of measurements.

In a possible design, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In a possible design, the feedback suggestion parameter includes at least one of the following types: a feedback type, a quantity of subcarriers in a subcarrier group, a quantity of bits of codebook information, or a quantity of bits of CSI.

In a possible design, the first information is carried in a MAC frame of the first PPDU, or the first information is carried in a PHY preamble of the first PPDU.

According to a sixth aspect, a communication apparatus is provided, including a processor, configured to perform the method in the first aspect, the second aspect, the third aspect, or the fourth aspect.

Optionally, the apparatus further includes a memory, where the memory stores instructions, and the processor executes the instructions in the memory to perform the method in the first aspect, the second aspect, the third aspect, or the fourth aspect.

Optionally, the memory is located inside or outside the apparatus.

Optionally, the apparatus further includes an interface circuit, and the processor is coupled to the interface circuit.

Optionally, there are one or more processors, and there are one or more memories.

Optionally, the memory may be integrated with the processor, or the memory and the processor are separately disposed.

In a specific implementation process, the memory may be a non-transitory (non-transitory) memory, such as a read-only memory (read-only memory, ROM). The memory and the processor may be integrated into one chip, or may be separately disposed in different chips. A type of the memory and a manner in which the memory and the processor are disposed are not limited in embodiments of this application.

The communication apparatus may be a chip, and the processor may be implemented by using hardware or software. When implemented by using hardware, the processor may be a logic circuit, an integrated circuit, or the like. When implemented by using software, the processor may be a general-purpose processor, and is implemented by reading software code stored in a memory, where the memory may be integrated into the processor, and may be located outside the processor and exist independently.

According to a seventh aspect, a processor is provided, including an input circuit, an output circuit, and a processing circuit. The processing circuit is configured to: receive a signal by using the input circuit, and transmit a signal by using the output circuit, to enable the processor to perform the method in the first aspect, the second aspect, the third aspect, or the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in embodiments of this application.

According to an eighth aspect, a computer program product is provided. The computer program product includes a computer program (which may also be referred to as code or instructions). When the computer program is run, a computer is enabled to perform the method in the first aspect, the second aspect, the third aspect, or the fourth aspect.

According to a ninth aspect, a computer-readable medium is provided. The computer readable medium stores a computer program (which may also be referred to as code or instructions). When the computer program is run on a computer, the computer is enabled to perform the method in the first aspect, the second aspect, the third aspect, or the fourth aspect.

According to a tenth aspect, a chip system is provided. The chip system includes a processor and an interface, and is configured to support a communication apparatus in implementing the functions in the first aspect, the second aspect, the third aspect, or the fourth aspect. In a possible design, the chip system further includes a memory, and the memory is configured to store information and data that are necessary for the foregoing communication apparatus. The chip system may include a chip, or may include a chip and another discrete component.

According to an eleventh aspect, a functional entity is provided. The functional entity is configured to implement the method in the first aspect to the second aspect, the third aspect, or the fourth aspect.

According to a twelfth aspect, a communication system is provided, including the first communication apparatus and the second communication apparatus according to the first aspect, the second aspect, the third aspect, or the fourth aspect.

For technical effects brought by any design manner of the second aspect, or the fourth aspect to the twelfth aspect, refer to technical effects brought by the first aspect or the third aspect. Details are not described herein again.

DESCRIPTION OF EMBODIMENTS

Figure 1:
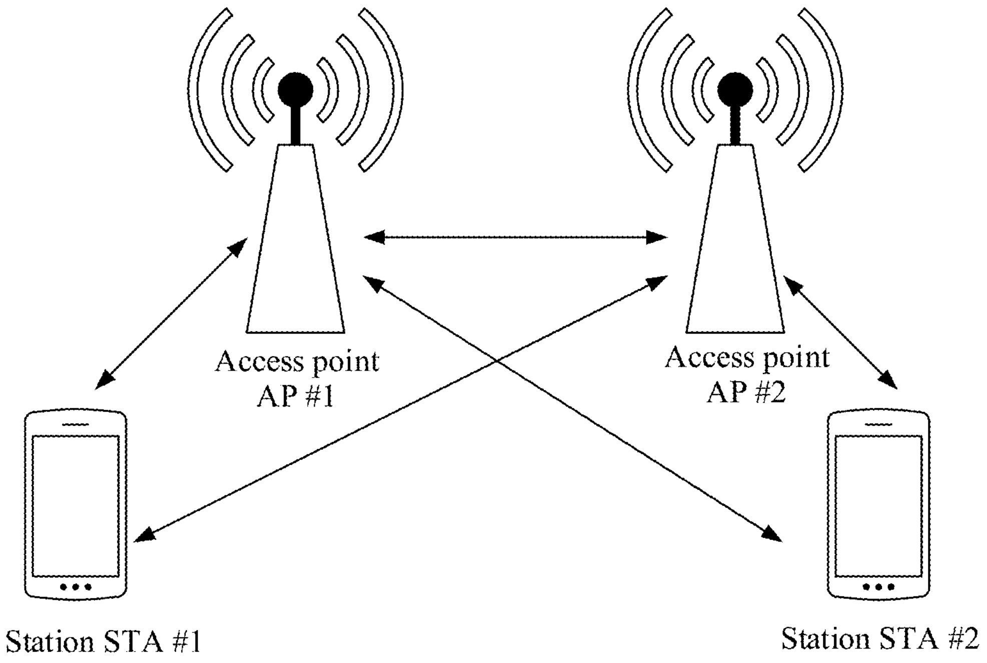
FIG. 1 is a schematic diagram of a communication system.

The following describes technical solutions of this application with reference to accompanying drawings.

The term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects. In this application, "at least one" refers to one or more, and "a plurality of" refers to two or more. In addition, it should be understood that in description of this application, terms such as "first", "second", and the like are merely used for distinguishing and description, but should not be understood as indicating or implying relative importance, or should not be understood as indicating or implying a sequence.

In addition, in this application, unless otherwise specified, for same or similar parts in embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application are not intended to limit the protection scope of this application.

The technical solutions in embodiments of this application may be applied to various communication systems, for example, a wireless local area network (wireless local area network, WLAN) communication system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a fifth generation (5th generation, 5G) system, a new radio (new radio, NR), a future sixth generation (6th generation, 6G) system, and the like.

For example, the following describes an application scenario and a method in embodiments of this application by using a WLAN system as an example.

Specifically, embodiments of this application may be applied to the WLAN system, and embodiments of this application may be applied to any protocol in the Institute of Electrical and Electronics Engineers (institute of electrical and electronics engineers, IEEE) 802.11 series protocols used by the WLAN, for example, 802.11a/b/g, 802.11n, 802.11ac, 802.11ax, 802.11be, 802.11bf, and future 802.11 protocols. The method provided in this application may be implemented by a communication device in a wireless communication system, or a chip or a processor in the communication device. Correspondingly, the communication device supports communication by using the IEEE 802.11 series protocols.

Although embodiments of this application are mainly described by using an example in which an IEEE 802.11 network is deployed, a person skilled in the art can easily understand that aspects involved in this application may be extended to another network using various standards or protocols, for example, BLUETOOTH (Bluetooth), a high performance radio LAN (high performance radio LAN, HIPERLAN) (which is a wireless standard similar to the IEEE 802.1 1 standard, and is mainly used in Europe), a wide area network (WAN), a wireless local area network (WLAN), a personal area network (personal area network, PAN), or another known or later developed network. Therefore, the various aspects provided in this application are applicable to any suitable wireless network regardless of coverage and wireless access protocols.

In addition, a communication system in this application is merely an example for description, and a communication system applicable to this application is not limited thereto. Unified descriptions are provided herein, and details are not described in the following.

For ease of understanding embodiments of this application, a communication system shown in FIG. 1 is first used as an example to describe in detail a communication system applicable to embodiments of this application.

A scenario system shown in FIG. 1 may be a WLAN system, and the WLAN system in FIG. 1 may include one or more APs and one or more STAs. The APs are, for example, an AP #1 and an AP #2 in FIG. 1, and the STAs are, for example, a STA #1 and a STA #2 in FIG. 1.

The AP may be an access point for a terminal device (such as a mobile phone) to access a wired (or wireless) network, and is mainly deployed at home, in a building, and in a campus. A typical coverage radius of the AP is tens of meters to more than 100 meters. Certainly, the AP may also be deployed outdoors. The access point is equivalent to a bridge that connects a wired network and a wireless network. A main function of the access point is to connect various wireless network clients together, and then connect the wireless network to the Ethernet. Specifically, the AP may be a terminal device (such as a mobile phone) or a network device (such as a router) with a wireless fidelity (Wireless Fidelity, Wi-Fi) chip. The access point may be a device that supports a plurality of WLAN standards of the 802.11 family, such as 802.11ax, 802.11ac, 802.11n, 802.11g, 802.11b, 802.11a, 802.11be, a next generation of 802.11be, and 802.11bf.

The access point may include a processor, a transmitter, and a receiver. The processor is configured to control and manage an action of the access point, the transmitter is configured to send information, and the receiver is configured to receive information.

The STA may be a wireless communication chip, a wireless sensor, a wireless communication terminal, or the like, and may also be referred to as user equipment. For example, the station may be a mobile phone, a tablet computer, a set-top box, a smart television set, a smart wearable device, a vehicle-mounted communication device, a computer, or the like that supports a Wi-Fi communication function. Optionally, the station may support a plurality of WLAN standards of the 802.11 family, such as 802.11ax, 802.11ac, 802.11n, 802.11g, 802.11b, 802.11a, 802.11be, a next generation of 802.11be, and 802.11bf.

The STA may include a processor, a transmitter, and a receiver. The processor is configured to control and manage an action of the STA, the transmitter is configured to send information, and the receiver is configured to receive information.

For example, the AP and the STA may be communication servers, switches, bridges, computers, mobile phones, and the like, and the AP and the STA may be applied to devices applied in an internet of vehicles, internet of things nodes, sensors, or the like in an internet of things (internet of things, IoT), smart cameras, smart remote controls, smart water or electricity meters, or the like in a smart home, or sensors in a smart city.

The access point and the station in embodiments of this application may also be collectively referred to as communication apparatuses. The communication apparatus may include a hardware structure and a software module, and the foregoing functions are implemented in a form of the hardware structure, the software module, or a combination of the hardware structure and the software module. A function in the foregoing functions may be implemented in a form of the hardware structure, the software module, or a combination of the hardware structure and the software module.

In a WLAN scenario, WLAN sensing (sensing) may be implemented based on a wireless passive sensing technology. Wireless passive sensing is a technology that uses influence of a human body/an object on a radio wave to sense existence, an action, and a movement of the human body/the object. This is because when performing communication in a wireless manner, the communication apparatus senses interference of the human body/the object to the radio wave, and the human body/the object may be sensed by using the interference.

In a WLAN sensing process, a sensing transmitter (sensing transmitter) may trigger channel measurement, and the sensing transmitter is referred to as a transmitter for short in the following. A sensing receiver (sensing receiver) may be configured to perform channel measurement, and the sensing receiver is referred to as a receiver for short in the following. A sensing initiator (sensing initiator) may be configured to initiate a sensing session, and the sensing session is used to trigger feeding back information related to channel measurement. The sensing initiator is referred to as an initiator for short in the following. A sensing responder (sensing responder) may be configured to: participate in the sensing session, return the information related to channel measurement, and the sensing responder is referred to as a responder in the following. For example, the information related to channel measurement includes a channel measurement result and/or a channel variation. The transmitter may be an AP or a STA, the receiver may be an AP or a STA, the initiator may be an AP or a STA, and the responder may be an AP or a STA. The transmitter and the initiator may be a same physical device or different physical devices. The receiver and the responder may be a same physical device or different physical devices.

During channel measurement, the transmitter may include a training symbol in a measurement packet, where the measurement packet may be an orthogonal frequency division multiplexing (orthogonal frequency division multiplexing, OFDM) subcarrier group. The receiver performs channel measurement based on structures of training symbols, and obtains CSI corresponding to each subcarrier group. The channel measurement result may be represented through CSI, that is, the CSI may reflect a status of a channel between communication apparatuses.

The receiver may determine the channel variation based on results of a plurality of channel measurements. For example, the receiver may determine the channel variation by comparing a plurality of pieces of CSI. Optionally, the receiver may determine the channel variation based on whether the channel variation meets a preset condition. When the channel variation does not meet the preset condition, it may be considered that the channel variation is small. When the channel variation meets the preset condition, it may be considered that the channel variation is large. That the channel variation does not meet the preset condition may be expressed in another manner. For example, the channel variation does not exceed (to be specific, the channel variation is less than, or less than or equal to) a specified variation threshold, or a channel state similarity degree is greater than a threshold. This is not limited herein. That the channel variation meets the preset condition may be expressed in another manner. For example, the channel variation exceeds (to be specific, the channel variation is greater than, or is greater than or equal to) a specified variation threshold, or a channel state similarity degree is less than a threshold.

Figure 2:
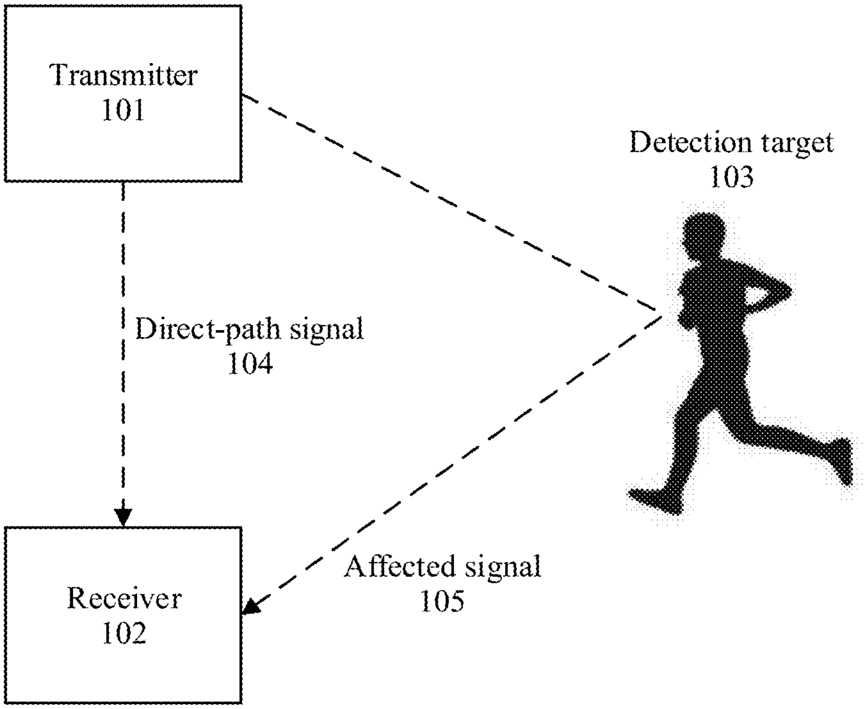
FIG. 2 is a schematic diagram of a communication system.

FIG. 2 is a schematic diagram of a WLAN sensing process applicable to an embodiment of this application. A WLAN system includes one or more transmitters (for example, a transmitter 101 in FIG. 2) and one or more receivers (for example, a receiver 102 in FIG. 2). The transmitter and the receiver may be disposed in a same physical device, or may be disposed in different physical devices.

During channel measurement, the transmitter 101 sends a signal, and the receiver 102 receives a signal. The signal received by the receiver 102 may include a direct-path signal 104 (which is a signal that is not affected by a detection target 103) and an affected signal 105 (which is a signal that is affected by the detection target 103). As the detection target 103 moves, the affected signal 105 changes. A superimposed wireless signal of the direct-path signal 104 and the affected signal 105 that are received by the receiver 102 also changes accordingly. In this way, the receiver 102 detects that a wireless channel changes. A change of the wireless channel may be represented by a change of an amplitude and a phase of CSI.

The receiver 102 may determine, based on results of two (or more than two) CSI measurements and a preset condition, a CSI variation, that is, a channel variation. For example, when the CSI variation meets the preset condition, the receiver 102 determines that the CSI variation is large. When the CSI variation does not meet the preset condition, the receiver 102 determines that the CSI variation is small. When the CSI variation is large, the transmitter 101 may further interact with the receiver 102, to obtain a more accurate channel measurement result.

Compared with using a wearable device such as a camera or a wristband for sensing, the wireless passive sensing technology does not need additional hardware costs, and a user does not need to wear a device. The wireless passive sensing technology facilitates monitoring on elderly people and children, and can detect possible intrusions and other situations. In addition, the wireless passive sensing technology has little impact on user privacy, can monitor bedroom and restroom areas, and can implement more comprehensive protection. Moreover, the wireless passive sensing technology can perform effective sensing when lighting is poor and even when there are obstacles (such as a curtain and wooden furniture), and can also sense a plurality of rooms across walls. The wireless passive wireless technology has high wireless sensing precision, and can perform gesture recognition and sleep breathing monitoring.

Figure 3:
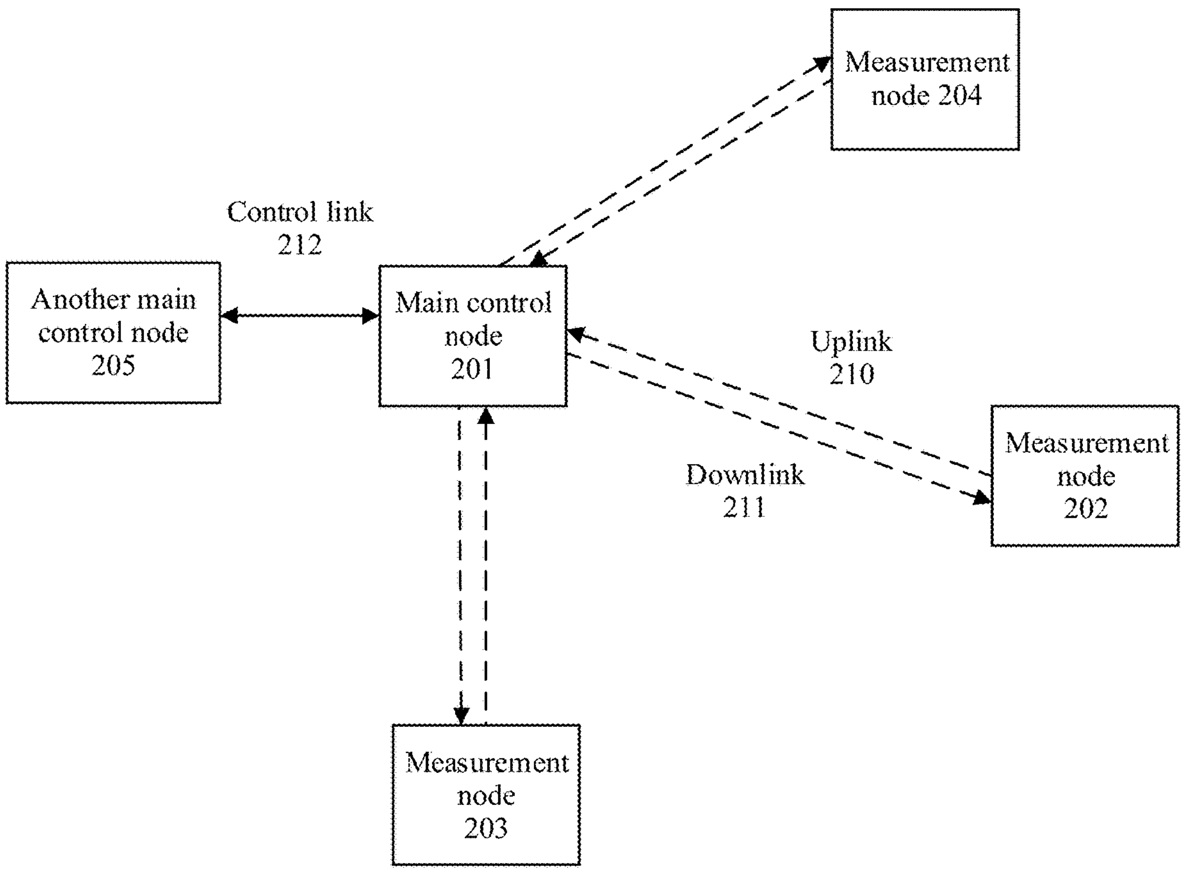
FIG. 3 is a schematic diagram of a communication system.

The WLAN sensing process shown in FIG. 2 is applicable to an architectural diagram of the communication system shown in FIG. 3. The communication system includes one or more main control nodes, such as a main control node 201 and another main control node 205 in FIG. 3. The communication system further includes one or more measurement nodes, for example, a measurement node 202, a measurement node 203, and a measurement node 204 in FIG. 3. A link sent by the measurement node and a link received by the main control node are referred to as uplinks 210. A link sent by the main control node and a link received by the measurement node are referred to as downlinks 211. The main control node 201 interacts with the another main control node 205 through a control link 212. The control link 212 may be connected by using a wired Ethernet or a wireless network, and may be configured to coordinate different main control nodes to perform detection.

The main control node may be a network element that supports Wi-Fi or another wireless network protocol. For example, the main control node may be deployed in a WLAN AP or a smart home control center. The measurement node may be a mobile device such as a mobile phone, or may be a device integrated with a WLAN function, such as a printer, an intelligent printer, or an intelligent electric lamp. The main control node and the measurement node may interact with each other by using a wireless network protocol (for example, a Wi-Fi protocol). The main control node may send a downlink measurement packet to the measurement node, and coordinate the measurement node to perform CSI measurement, to obtain an existence and a motion status of a surrounding human body/object.

A transmitter in a measurement process may be the main control node or the measurement node, and a receiver may be the main control node or the measurement node. In other words, the main control node may be a transmitter or a receiver in the measurement process, and the measurement node may be a transmitter or a receiver in the measurement process. In some possible cases, the main control node may be neither a transmitter nor a receiver, but may control a plurality of measurement nodes to separately serve as a transmitter, a receiver, or the like. This is not limited in this embodiment of this application.

The communication system shown in FIG. 3 may be applied to a home scenario and an office scenario.

Figure 4A:
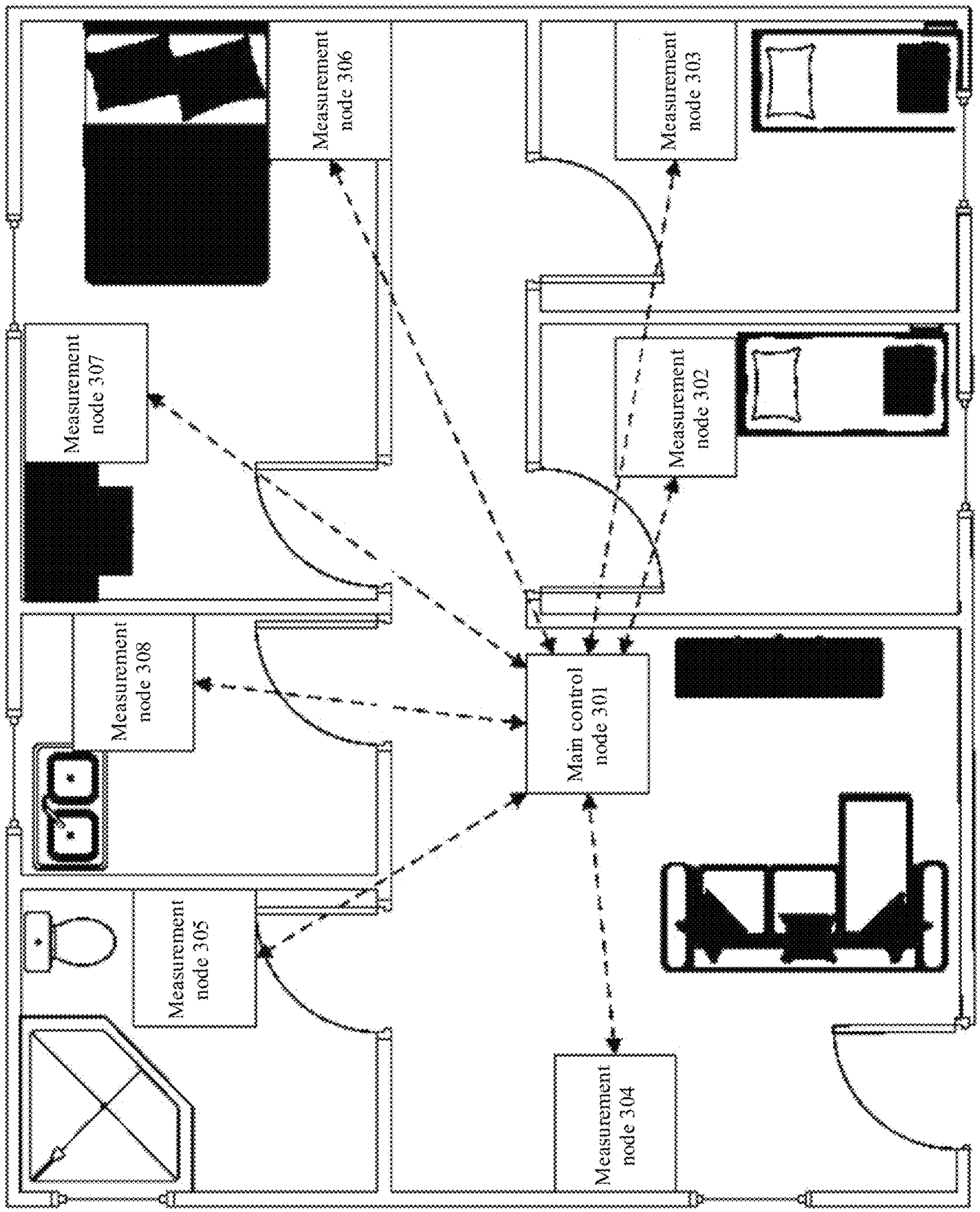
FIG. 4*a* is a schematic diagram of a communication system in a home environment.

A possible home scenario is shown in FIG. 4*a*. In a home environment shown in FIG. 4*a*, one main control node 301 and a plurality of measurement nodes are deployed, for example, a measurement node 302, a measurement node 303, a measurement node 304, a measurement node 305, a measurement node 306, a measurement node 307, and a measurement node 308. The main control node 301 may perform measurement interaction with the plurality of measurement nodes to monitor an entire home environment. For example, a link between the main control node 301 and the measurement node 305 may be used to measure an action status in a bathroom. If a slip action is detected, the main control node 301 may send an alarm in time to notify a guardian, a medical personnel, and the like. For another example, links between the main control node 301 and the measurement node 302, the measurement node 303, and the measurement node 306 may be used to measure a bedroom situation and monitor a sleep status of a user.

Figure 4B:
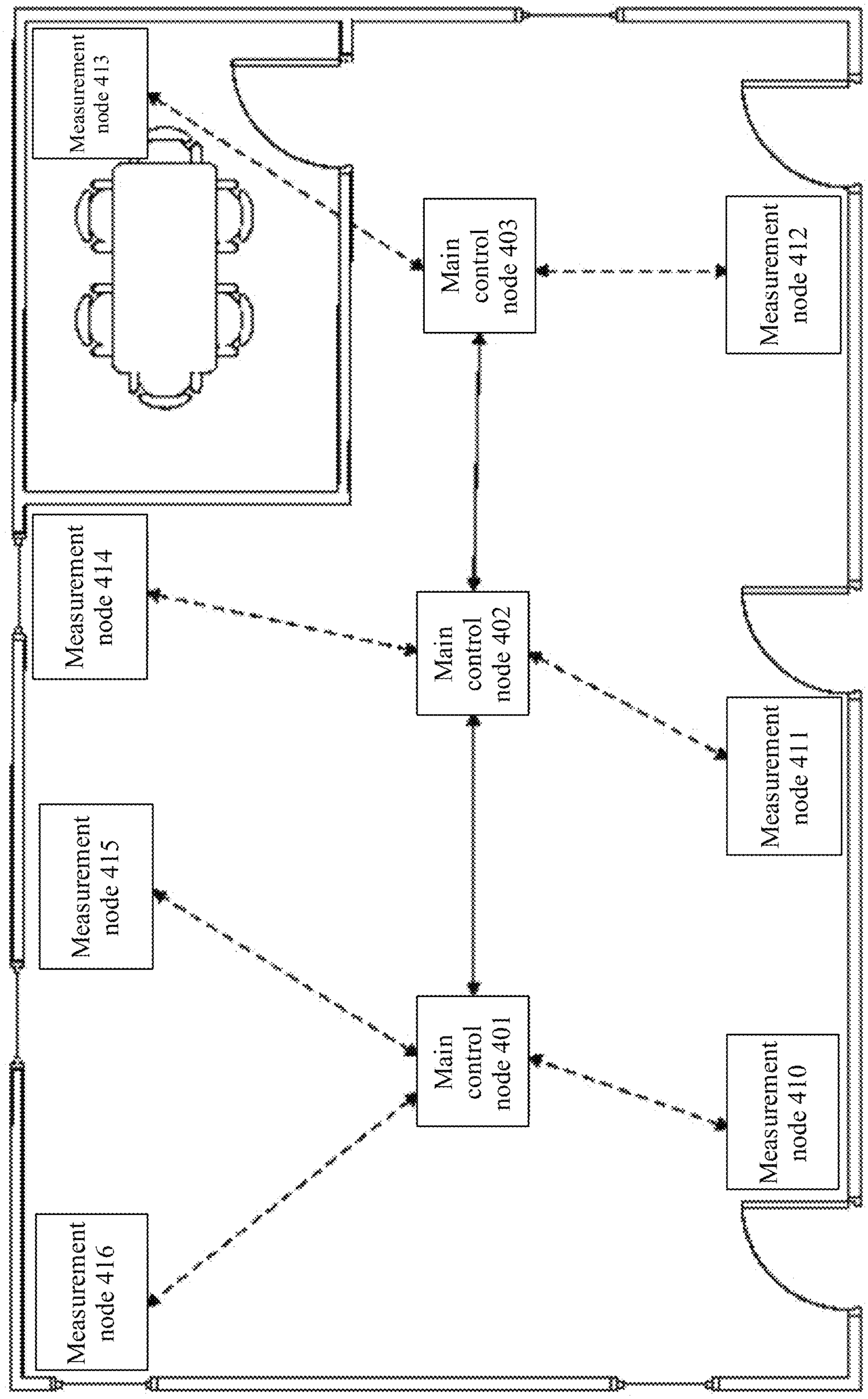
FIG. 4*b* is a schematic diagram of a communication system in an office environment.

The office scenario may include industrial and commercial environments. A possible office scenario is shown in FIG. 4*b*. In the office scenario, a to-be-monitored area is usually large, and a plurality of main control nodes may be used, for example, a main control node 401, a main control node 402, and a main control node 403. The main control node interacts with different measurement nodes to measure a specific area. For example, a link between the main control node 401 and a measurement node 410 may be used to monitor an entry and exit situation at a door. For another example, a link between the main control node 403 and a measurement node 413 may be used to collect statistics on occupancy of a conference room and a quantity of participants in a conference.

Figure 5:
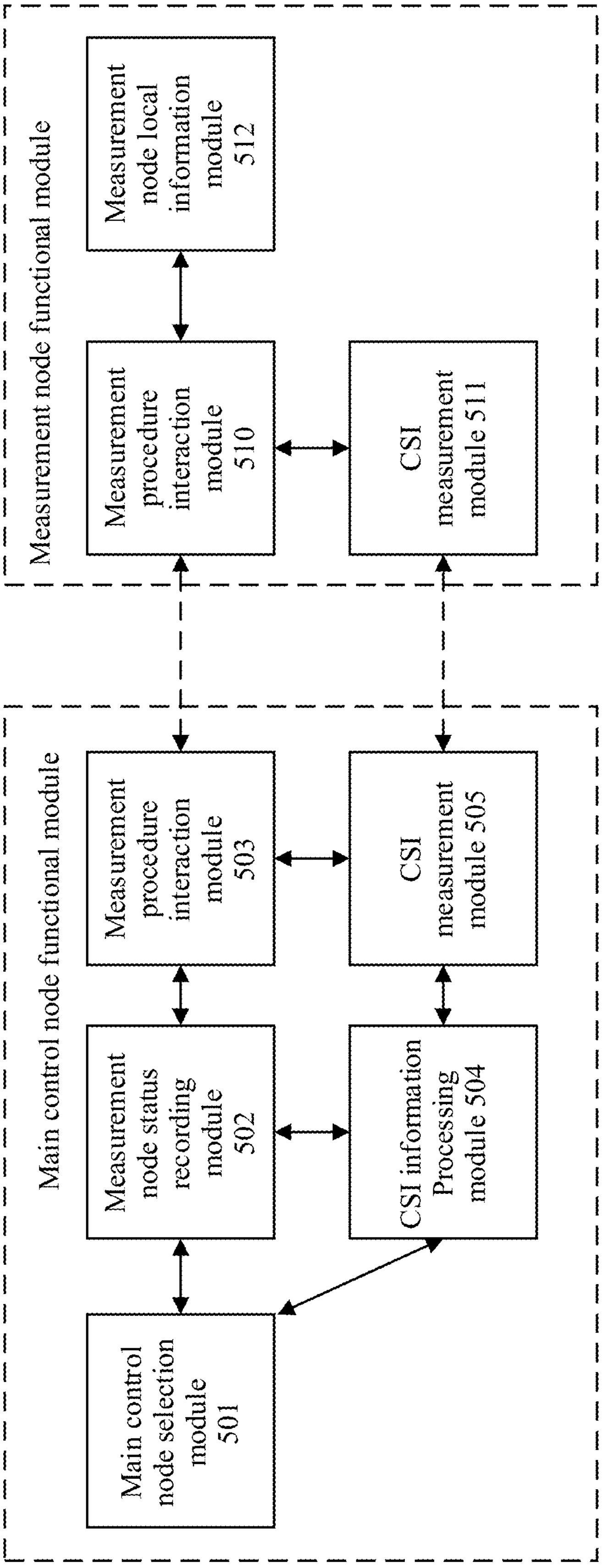
FIG. 5 is a schematic diagram of functional modules of a main control node and a measurement node.

Optionally, the main control node and the measurement node may be implemented by using functional modules in FIG. 5. FIG. 5 is a schematic diagram of a structure of a main control node functional module and a schematic diagram of a structure of a measurement node functional module according to an embodiment of this application.

The main control node functional module includes a main control node selection module 501, a measurement node status recording module 502, a measurement procedure interaction module 503, a CSI information processing module 504, and a CSI measurement module 505. The main control node selection module 501 may be responsible for selecting a main control node from a plurality of nodes that can undertake tasks of the main control node, and may also be responsible for interaction between main control nodes. The measurement node status recording module 502 may be responsible for storing information of all measurement nodes under the main control node. Information of a measurement node includes but is not limited to at least one piece of the following information: a measurement node identifier (for example, a MAC address of a measurement node and an association identifier (association identifier, AID) of the measurement node), a sensing identifier (sensing identifier, SID) allocated to an unassociated measurement node, a measurement capability of the measurement node, a location of the measurement node, historical CSI measurement information of the measurement node, a preset condition for triggering sensing by the measurement node, and the like. The measurement procedure interaction module 503 may be responsible for protocol processing of interaction between the main control node and the measurement node. The CSI information processing module 504 may be responsible for processing collected CSI information. The CSI measurement module 505 may be responsible for measuring a training symbol in a measurement packet sent by the measurement node, may output an uplink CSI measurement matrix of each subcarrier or subcarrier group after receiving the measurement packet, and may also be responsible for sending the uplink CSI measurement matrix to the CSI information processing module 504 for subsequent processing.

The measurement node functional module includes a measurement procedure interaction module 510, a CSI measurement module 511, and a measurement node local information module 512. The measurement procedure interaction module 510 may be responsible for responding to measurement interaction information of the main control node. The CSI measurement module 511 may be responsible for measuring a measurement packet sent by the main control node and obtaining a downlink CSI measurement matrix. The measurement node local information module 512 may be responsible for storing measurement-related information. The measurement-related information includes but is not limited to at least one piece of the following information: a measurement session identifier, CSI measured by the measurement node last time, a time stamp fed back by the measurement node last time, and the like.

Functional modules of the main control node and the measurement node in FIG. 5 may be implemented by using a hardware chip, or may be implemented through firmware refreshing. Alternatively, some functional modules (for example, the main control node selection module 501 or the CSI information processing module 504) may be implemented by an operating system or driver software.

It may be understood that the structure shown in FIG. 5 does not constitute a specific limitation on the main control node and the measurement node. For example, in some other embodiments of this application, the main control node and the measurement node may include more or fewer components than those shown in the figure, some components may be combined, some components may be split, or the components may be differently arranged. The components shown in the figure may be implemented by hardware, software, or a combination of software and hardware. For example, the main control node includes a transceiver, a memory, and a processor. The transceiver may implement a function of the measurement procedure interaction module 503, the memory may implement a function of the measurement node status recording module 502, and the processor may implement functions of the main control node selection module 501, the CSI information processing module 504, and the CSI measurement module 505. For another example, the main control node includes a transceiver, a memory, and a processor. The transceiver may implement a function of the measurement procedure interaction module 510, the memory may implement a function of the measurement node local information module 512, and the processor may implement a function of the CSI measurement module 511.

Figure 6:
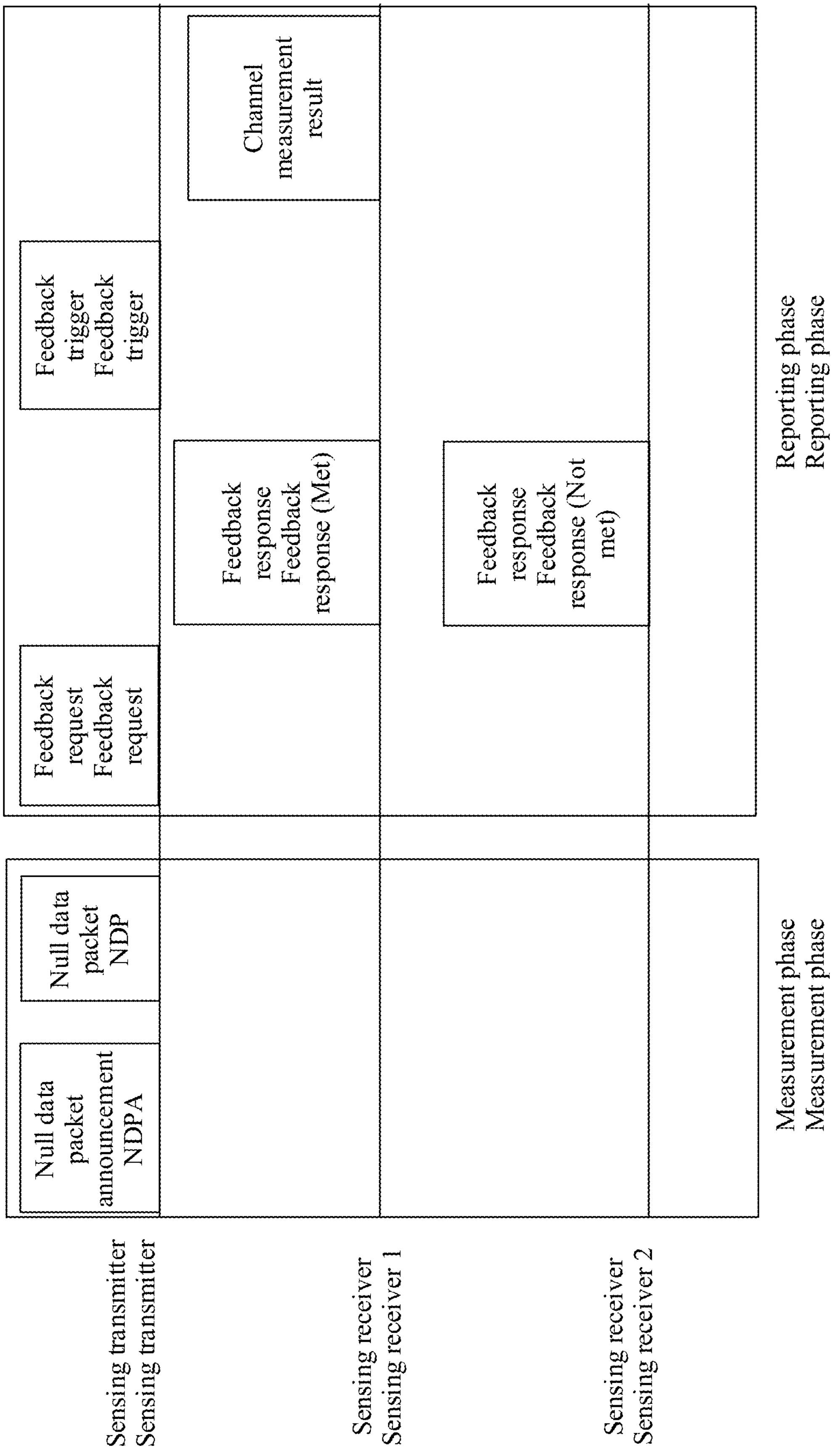
FIG. 6 is a schematic diagram of a sensing process.

FIG. 6 is a schematic diagram of a possible channel measurement process. In a measurement phase, a transmitter sends an NDPA and an NDP to indicate one or more receivers to perform channel measurement (also referred to as CSI measurement). In a reporting phase, the transmitter sends a feedback request (feedback request), to request to feed back a channel variation, a receiver 1 sends a feedback response (feedback response), where the feedback response carries Met (Met) information, and the Met information indicates that the channel variation meets a preset condition, and a receiver 2 sends a feedback response, where the feedback response carries Not Met (Not Met) information, and the Not Met information indicates that a channel variation does not meet the preset condition. The transmitter triggers a receiver that sends the Met information to feed back a channel measurement result. For example, the transmitter sends a feedback trigger (feedback trigger) to the receiver 1, where the feedback trigger is used to trigger the channel measurement result, and the receiver 1 returns the channel measurement result.

Herein, the receiver feeds back only the Met information or the Not Met information, and the Met information or the Not Met information indicates that reliability of the channel variation is low. However, the transmitter cannot accurately determine, based only on the Met information or the Not Met information, whether to trigger a receiver to feed back the channel measurement result. As a result, accuracy of channel measurement is reduced.

Based on this, embodiments of this application provide a feedback method. The feedback method provided in embodiments of this application is described in detail below by using an example in which a first communication apparatus interacts with a second communication apparatus. The first communication apparatus may be a transmitter (sensing transmitter), and a processing process at the transmitter may also be completed by an initiator (sensing initiator). In a possible scenario, a measurement phase is completed by the transmitter, and a reporting phase may be completed by the initiator. The second communication apparatus may be a receiver (sensing receiver), and a processing process at the receiver may also be completed by a responder (sensing responder). The first communication apparatus may be both a transmitter and a receiver, that is, the first communication apparatus may implement functions of the transmitter and the receiver (for example, the first communication apparatus may be a radar). Alternatively, the first communication apparatus may be both an initiator and a responder. The second communication apparatus may be both a transmitter and a receiver, or the second communication apparatus may be both an initiator and a responder.

It may be understood that in embodiments of this application, the first communication apparatus and/or the second communication apparatus may perform some or all of steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

It should be noted that, in following embodiments of this application, names of messages or names of parameters in messages between devices are merely examples, and the messages or the parameters may have other names in specific implementations. This is not specifically limited in embodiments of this application.

In the feedback method provided in embodiments of this application, first information includes at least one of the following types of information: channel state information CSI measurement quantity indication information required for channel variation calculation, a CSI type for the channel variation calculation, information about a rule for the channel variation calculation, or a feedback suggestion parameter. The first information is used as another type of information related to a channel measurement result, and is used to select a second communication apparatus that sends a feedback result. Therefore, compared with a case in which the first communication apparatus uses only whether a channel variation meets a preset condition as a trigger condition, the first communication apparatus can more accurately determine, based on the received first information, a second communication apparatus/second communication apparatuses to be triggered, and a triggered second communication apparatus/triggered second communication apparatuses sends/send a feedback result. In this way, accuracy of channel measurement can be improved.

Figures 7, 8:
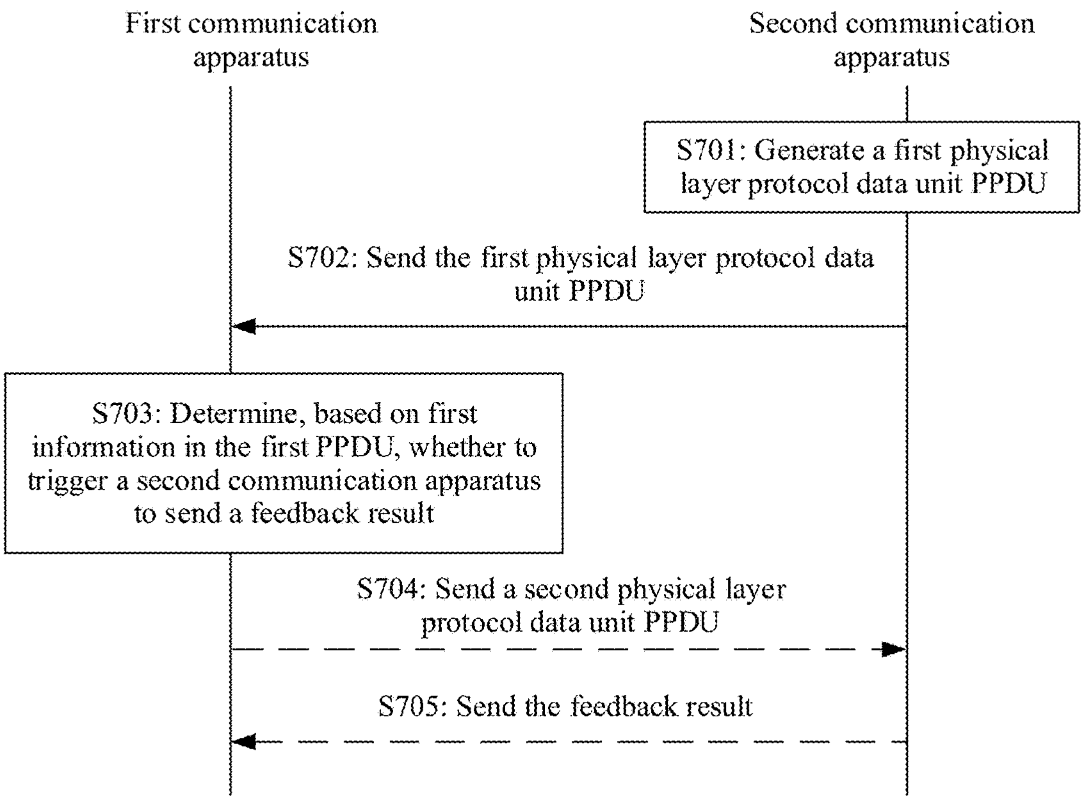
FIG. 7 is a schematic diagram of a feedback process according to an embodiment of this application.
FIG. 8 is a schematic diagram of a structure of a PPDU frame according to an embodiment of this application.

FIG. 7 shows a feedback method according to an embodiment of this application. There may be one or more first communication apparatuses, and there may be one or more second communication apparatuses. In this embodiment of this application, an example in which there is one first communication apparatus and there are a plurality of second communication apparatuses is used for description. Specifically, the feedback method includes the following steps.

S701: A second communication apparatus generates a first PPDU.

S702: The second communication apparatus sends the first PPDU.

Correspondingly, a first communication apparatus receives the first PPDU.

The first PPDU includes first information, and the first information is another type of information related to a channel measurement result. The first information is different from a channel measurement result and information indicating a channel variation mentioned above. The first information may indicate the first communication apparatus to determine a second communication apparatus that triggers a feedback result. That is, the first communication apparatus may select, based on the first information, a second communication apparatus that sends the feedback result. The first information may further indicate a manner in which the first communication apparatus triggers the feedback result. That is, the first communication apparatus may determine, based on the first information, the manner in which the first communication apparatus triggers the feedback result. For example, the first information may include information indicating a manner of triggering the feedback result.

The manner of triggering the feedback result may be at least one of the following manners: triggering by using a feedback request (feedback request) frame, triggering by using a feedback trigger (feedback trigger) frame, or triggering by using a polling (polling) frame.

Optionally, the first PPDU may further include second information, and the second information may indicate whether a channel variation meets a preset condition.

Optionally, the first PPDU may further include fourth information, and the fourth information indicates a channel variation degree.

It should be noted that the first PPDU may carry the second information and the fourth information, or may carry only one of the second information and the fourth information. This is not limited in this application. In an example, the first PPDU carries only the second information, the first communication apparatus may further determine, based on the first information and the second information, whether a second communication apparatus sends the feedback result, and select the second communication apparatus that sends the feedback result, to further improve decision-making accuracy. In another example, the first PPDU carries only the fourth information. Herein, the first communication apparatus and the second communication apparatus may negotiate, in advance, a correspondence between the channel variation degree and whether the channel variation meets the preset condition. The first communication apparatus may determine, based on the channel variation degree, whether the channel variation meets the preset condition, to further determine, based on a determining result and the first information, whether a second communication apparatus sends the feedback result, and select the second communication apparatus that sends the feedback result, to further improve decision-making accuracy. In still another example, the first PPDU carries the second information and the fourth information, and the first communication apparatus may more accurately determine, based on the first information, the second information, and the fourth information, whether to send the feedback result to the second communication apparatus.

Optionally, the first information is carried in a MAC frame of the first PPDU, that is, a data field of the first PPDU includes the MAC frame, and the MAC frame includes the first information. For example, a new element (element) may be defined, and the new element includes the first information. For another example, the first information may be included in an existing aggregation (aggregation, A) control subfield (control subfield). In an example, the first information may be carried in a command and status (command and status, CAS) control subfield (control subfield). For another example, a new A-Control subfield may be defined. In an example, the new A-Control subfield may be defined by defining a new control ID, and the new A-Control subfield carries the first information.

Optionally, the first information is carried in a PHY preamble of the first PPDU.

In a possible example, the first PPDU may be fed back in a reporting phase. For example, the first PPDU may carry a feedback response (feedback response) frame, and the feedback response frame includes a result indicating whether the channel variation exceeds a specified variation threshold.

The first information may include but is not limited to at least one of the following types of information: CSI measurement quantity indication information required for channel variation calculation, a CSI type for the channel variation calculation, information about a rule for the channel variation calculation, or a feedback suggestion parameter. The feedback suggestion parameter indicates a suggested feedback form. The following describes in detail the four types of information that may be included in the first information in a form of information 1 to 4 (that is, information 1 to information 4).

Information 1: CSI Measurement Quantity Indication Information Required for Channel Variation Calculation.

The information may be shown in Table 1, and includes but is not limited to at least one of the following types of information: indication information indicating whether more measurements are required, a total quantity of measurements, or a remaining quantity of measurements.

TABLE 1

| | Information | Description |
|---|---|---|
| CSI measurement quantity indication information required for channel variation calculation | Information indicating whether more measurements are required | Whether a current quantity of measurements can determine a channel variation |
| | A total quantity of measurements | A total quantity of measurements required to determine a channel variation |
| | A remaining quantity of measurements | A quantity of measurements additionally required for determining a channel variation |

The following describes in detail information included in the CSI measurement quantity indication information required for the channel variation calculation.

(1) Information Indicating Whether More Measurements are Required

The information may indicate whether the channel variation can be determined based on a current quantity of measurements. That is, the information indicates whether more measurements are required to determine the channel variation.

For example, 1 bit (bit) may be used to indicate the indication information indicating whether more measurements are required. For example, when a value of the 1 bit is 0, it indicates that the channel variation cannot be determined based on the current quantity of measurements, and more measurements are required. When a value of the 1 bit is 1, it indicates that the channel variation can be determined based on the current quantity of measurements, and no more measurements are required. For another example, when a value of the 1 bit is 1, it indicates that the channel variation cannot be determined based on the current quantity of measurements, and more measurements are required. When a value of the 1 bit is 0, it indicates that the channel variation can be determined based on the current quantity of measurements, and no more measurements are required.

Optionally, if the first information received by the first communication apparatus includes indication information indicating that more measurements are required, the first communication apparatus may trigger a second communication apparatus that sends the indication information indicating more measurements are required again to perform channel measurement. That is, the second communication apparatus notifies, through the indication information that is included in the first information and that indicates whether more measurements are required, the first communication apparatus that the channel variation cannot be determined based on the current quantity of measurements, and more measurements are required. In this case, the first communication apparatus triggers the second communication apparatus again to perform channel measurement, so that the second communication apparatus has an abundant quantity of measurements to complete channel measurement and determine the channel variation. In a possible scenario, the second communication apparatus performs channel measurement only once. However, the channel variation can be determined based on results (for example, a plurality of pieces of CSI) of a plurality of channel measurements. In this case, the second communication apparatus may send the indication information indicating that more measurements are required.

If the first information received by the first communication apparatus includes indication information indicating that no more measurements are required, the first communication apparatus may determine that the second communication apparatus has an abundant quantity of measurements to complete channel measurement. That is, the first communication apparatus determines that the second communication apparatus can calculate the channel variation, and the first communication apparatus may trigger the second communication apparatus to send a feedback result.

(2) A Total Quantity of Measurements

The information may indicate a total quantity of measurements required for determining the channel variation. The total quantity of measurements is a positive integer. Optionally, the first communication apparatus may determine, based on the total quantity of measurements and a current quantity of measurements, whether to trigger or continue triggering the second communication apparatus to perform channel measurement. The current quantity of measurements may be a quantity of channel measurements that the first communication apparatus has triggered the second communication apparatus to perform. In a possible implementation, each time the first communication apparatus triggers the second communication apparatus to perform channel measurement, the first communication apparatus may update a current quantity of measurements of the second communication apparatus stored in the first communication apparatus.

Optionally, if the first communication apparatus determines that the current quantity of measurements of the second communication apparatus reach the total quantity of measurements, the first communication apparatus may trigger the second communication apparatus to send the feedback result. On the contrary, if the first communication apparatus determines that a target quantity of measurements of the second communication apparatus do not reach the total quantity of measurements, the first communication apparatus may trigger the second communication apparatus to perform channel measurement without triggering the second communication apparatus to send the feedback result.

(3) A Remaining Quantity of Measurements

The information may indicate a quantity of measurements additionally required for determining the channel variation. The remaining quantity of measurements is a non-negative integer. Optionally, when the remaining quantity of measurements is not 0, the first communication apparatus may continue triggering the second communication apparatus to perform channel measurement. When the remaining quantity of measurements is 0, the first communication apparatus may trigger the second communication apparatus to send the feedback result.

It should be noted that the CSI measurement quantity indication information required for the channel variation calculation may include any one piece of the indication information indicating whether more measurements are required, the total quantity of measurements, and the remaining quantity of measurements, or may be a combination of the foregoing information. This is not limited in this application.

For example, the CSI measurement quantity indication information required for the channel variation calculation may include the indication information indicating whether more measurements are required and the remaining quantity of measurements. That is, the second communication apparatus not only notifies the first communication apparatus of indication information indicating that the second communication apparatus needs to perform more measurements, but also notifies the first communication apparatus of a quantity of measurements additionally required by the second communication apparatus to determine the channel variation. This helps the first communication apparatus more accurately determine, based on the indication information, whether to trigger the second communication apparatus to continue performing channel measurement.

Information 2: a CSI Type for Channel Variation Calculation

The information may be shown in Table 2, and includes but is not limited to at least one of the following types of information: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

TABLE 2

| | Information | Description |
|---|---|---|
| CSI type for channel variation calculation | CSI measured this time | Calculate a channel variation based on CSI measured this time |
| | CSI whose measurement moment exceeds a specified time threshold | Calculate a channel variation based on CSI whose measurement moment exceeds a specified time threshold |
| | CSI whose quantity of measurements exceeds a specified quantity threshold | Calculate a channel variation based on CSI whose quantity of measurements exceeds a specified quantity threshold |
| | CSI measured last time | Calculate a channel variation based on CSI measured last time |
| | CSI measured for a first time | Calculate a channel variation based on CSI measured for a first time |
| | Average CSI | Calculate a channel variation based on average CSI |
| | Numbered CSI | Calculate a channel variation based on CSI corresponding to a number |
| | Flagged CSI | Calculate a channel variation based on flagged CSI |

The following describes in detail the CSI type for the channel variation calculation.

(1) CSI Measured this Time

This CSI type may indicate that the channel variation is calculated based on CSI measured this time, that is, the channel variation is calculated based on the CSI measured this time. The CSI measured this time is latest measured CSI, for example, CSI whose measurement moment is closest to a current moment.

Optionally, the second communication apparatus may calculate, by default, the channel variation based on the CSI measured this time. In this case, the first information may not carry the CSI measured this time, or may not carry information indicating the CSI measured this time. In a possible case, the first communication apparatus and the second communication apparatus negotiate in advance to calculate the channel variation based on the CSI measured this time, and no additional signaling indication is required. Therefore, when the second communication apparatus does not feed back the CSI type for the channel variation calculation, the first communication apparatus considers, by default, that the second communication apparatus calculates the channel variation based on the CSI measured this time.

If the CSI type for the channel variation calculation carries the CSI measured this time, because a measurement moment of the CSI measured this time is close to a current moment, it may be considered that the channel variation calculated by using the CSI measured this time can reflect a current scenario. In this case, the first communication apparatus may more accurately determine, based on the CSI measured this time, whether to trigger the second communication apparatus to send the feedback result.

(2) CSI Whose Measurement Moment Exceeds a Specified Time Threshold

This CSI type may indicate that the channel variation is calculated based on CSI whose measurement moment exceeds a specified time threshold. In this case, the channel variation may not reflect a current scenario. For a channel variation that cannot reflect the current scenario, the first communication apparatus may not trigger the second communication apparatus to send the feedback result. The CSI whose measurement moment exceeds the specified time threshold may be considered as old CSI. The specified time threshold is arbitrary, and this is not limited in this embodiment of this application. For example, when a time difference between a measurement moment of one piece of CSI and a current moment is greater than the specified time threshold, it may be considered that the CSI is the CSI whose measurement moment exceeds the specified time threshold.

If the CSI type for the channel variation calculation carries the CSI whose measurement moment exceeds the specified time threshold, because a period of time has passed from a measurement moment of the CSI whose measurement moment exceeds the specified time threshold to a moment of a current scenario, the first communication apparatus may consider that the channel variation may not reflect the current scenario, and then the first communication apparatus further determines not to trigger the second communication apparatus to send the feedback result.

(3) CSI Whose Quantity of Measurements Exceeds a Specified Quantity Threshold

This CSI type may indicate that the channel variation is calculated based on CSI whose quantity of measurements exceeds a specified quantity threshold. In this case, the channel variation may not reflect a current scenario. For a channel variation that cannot reflect the current scenario, the first communication apparatus may not trigger the second communication apparatus to send the feedback result. The CSI whose quantity of measurements exceeds the specified quantity threshold may be considered as old CSI. The specified quantity threshold is arbitrary, and this is not limited in this embodiment of this application. For example, one or more CSI measurements are performed in a time period between a measurement moment of first CSI and a measurement moment of second CSI, and when a quantity of the one or more of CSI measurements is greater than the specified quantity threshold, it may be considered that the first CSI is the CSI whose quantity of measurements exceeds the specified quantity threshold.

If the CSI type for channel variation calculation carries the CSI whose quantity of measurements exceeds the specified quantity threshold, because a plurality of CSI measurements are performed after a measurement moment of the CSI whose quantity of measurements exceeds the specified quantity threshold, it may be considered that a period of time has passed from a moment of a current scenario to the measurement moment of the CSI whose quantity of measurements exceeds the specified quantity threshold. In this case, the first communication apparatus may consider that the channel variation may not reflect the current scenario, and further determine not to trigger the second communication apparatus to send the feedback result.

(4) CSI Measured Last Time

This CSI type may indicate that the channel variation is calculated based on CSI measured last time. The CSI measured last time is CSI closest to CSI measured this time, that is, a measurement moment of the CSI measured last time is closest to a measurement moment of the CSI measured this time, and the CSI measured last time is CSI whose measurement moment is earlier than the measurement moment of the CSI measured this time.

If the CSI type for the channel variation calculation carries the CSI measured last time, because the measurement moment of the CSI measured last time may be close to a current moment, it may be considered that the channel variation calculated by using the CSI measured last time can reflect a current scenario. In this case, the first communication apparatus may more accurately determine, based on the CSI measured this time, whether to trigger the second communication apparatus to send the feedback result.

(5) CSI Measured for a First Time

This CSI type may indicate that the channel variation is calculated based on CSI measured for a first time. The CSI measured for a first time may be CSI measured when the first communication apparatus triggers channel measurement for a first time.

If the CSI type for the channel variation calculation carries the CSI measured for a first time, and if a time difference between a measurement moment of the CSI measured for a first time and a current moment is large, the first communication apparatus may determine not to trigger the second communication apparatus to send the feedback result. If the time difference between the measurement moment of the CSI measured for a first time and the current moment is small, the first communication apparatus may determine to trigger the second communication apparatus to send the feedback result.

(6) Average CSI

This CSI type may indicate that the channel variation is calculated based on average CSI. The average CSI may be average CSI calculated by the second communication apparatus based on one or more pieces of CSI.

(7) Numbered CSI

This CSI type may indicate that the channel variation is calculated based on numbered CSI. There may be one or more CSI numbers. A rule for numbering CSI is random, which is not limited in this embodiment of this application. However, it needs to be ensured that a same numbering rule is negotiated between the first communication apparatus and the second communication apparatus in advance.

If the CSI type for the channel variation calculation carries the numbered CSI, a number of the CSI is carried in the CSI type for the channel variation calculation. For example, the second communication apparatus may number CSI obtained by performing channel measurement each time. In this way, the first communication apparatus may determine, based on the number of the CSI, that the first information carries the numbered CSI, and determine the number of the CSI. The number of the CSI may indicate that the second communication apparatus calculates the channel variation by using CSI obtained through which channel measurement.

(8) Flagged CSI

This CSI type may indicate that the channel variation is calculated based on flagged CSI. The flagged CSI may be one or more pieces of CSI, that is, the second communication apparatus stores flags of the one or more pieces of CSI. The flagged CSI is arbitrary. This is not limited in this embodiment of this application. For example, the flagged CSI may be CSI measured for a first time.

If only one piece of flagged CSI is allowed to be stored in the second communication apparatus, a flag of a previously stored flagged CSI may be removed before a new piece of CSI is flagged, that is, a currently stored flagged CSI is no longer flagged.

It should be noted that the CSI type for the channel variation calculation may include any one of the CSI measured this time, the CSI whose measurement moment exceeds the specified time threshold, the CSI whose quantity of measurements exceeds the specified quantity threshold, the CSI measured last time, the CSI measured for a first time, the average CSI, the numbered CSI, and the flagged CSI, and may alternatively be a combination of the foregoing information. This is not limited in this application.

In a possible scenario, the first information sent by the second communication apparatus includes the CSI type for the channel variation calculation, and the CSI type for the channel variation calculation carries currently measured CSI and flagged CSI or carries currently measured CSI and CSI measured for a first time. That is, the second communication apparatus compares the currently measured CSI with the flagged CSI to determine the channel variation. Alternatively, the second communication apparatus compares the currently measured CSI with the CSI measured for a first time to determine the channel variation. The first communication apparatus determines, based on the first information, that the second communication apparatus can calculate the channel variation, and determines to trigger the second communication apparatus to send the feedback result.

In this scenario, for an object that moves slowly, a difference between channel variations calculated at two consecutive channel measurements is not excessively large (a CSI variation is not excessively large). Therefore, the second communication apparatus compares the currently measured CSI with the flagged CSI to determine the channel variation, or the second communication apparatus compares the currently measured CSI with the CSI measured for a first time, to select the object that moves slowly. This scenario is only a possible example, and the object that moves slowly may be measured in another manner.

In another possible scenario, the first information sent by the second communication apparatus includes the CSI type for the channel variation calculation, and the CSI type for the channel variation calculation carries currently measured CSI and CSI measured last time. That is, the second communication apparatus compares the currently measured CSI with the CSI measured last time to determine the channel variation. The first communication apparatus determines, based on the first information, that the second communication apparatus can calculate the channel variation, and determines to trigger the second communication apparatus to send the feedback result.

In this scenario, for an object that moves quickly, a different between channel variations calculated at two consecutive channel measurements is large (a CSI variation is large). Therefore, the second communication apparatus compares the currently measured CSI with the CSI measured last time to determine the channel variation. In this way, the object that moves quickly is selected. This scenario is only a possible example, and the object that moves quickly may be measured in another manner.

In addition, in this scenario, for user gesture recognition, a change of user gestures is fast and lasts short, and CSI measured each time is important. Therefore, the second communication apparatus compares currently measured CSI with CSI measured last time to recognize the change of the user gestures.

It may be understood that the foregoing possible scenarios are merely used as examples, and do not constitute a limitation on another possible scenario. According to the method provided in this embodiment of this application, different CSI types may be selected for different scenarios to perform channel variation estimation, so that the channel variation estimation can be more accurate, and accuracy of channel measurement can be improved.

Information 3: Information about a Rule for Channel Variation Calculation

The information may indicate a rule for the channel variation calculation.

In a possible implementation, the information about the rule for channel variation calculation may be an identifier of the rule. The second communication apparatus may store one or more rules, for example, a formula 1, a formula 2, and a formula 3. If the second communication apparatus calculates the channel variation according to the formula 1, the information about the rule for the channel variation calculation may be the formula 1.

For example, the rule for the channel variation calculation may be a formula for comparing channel differences or channel similarities, and a higher similarity indicates a smaller difference and a smaller channel variation. For example, a similarity determining manner of normalizing a product of two channel vectors is used. For example, a similarity determining method may be the following evaluation algorithm 1 or evaluation algorithm 2. For example, 1 bit may be used to represent the information about the rule for the channel variation calculation. When a value of the 1 bit is 0, it indicates that the rule for the channel variation calculation is the evaluation algorithm 1. When a value of the 1 bit is 1, it indicates that the rule for the channel variation calculation is the evaluation algorithm 2.

In a possible implementation, the evaluation algorithm 1 is a time-reversal resonating strength (time-reversal resonating strength, TRRS) algorithm. TRRS is a maximum magnitude of a cross-correlation coefficient obtained by performing convolution on two channel impulse responses (channel impulse response, CIR), and is used to measure similarity between the two CIRs. A larger value of the TRRS indicates that the two CIRs are more similar and indicates a smaller change. A value range of the TRSS is [0, 1].

For an area to be sensed, it is assumed that a CIR received by a STA during sensing measurement at a moment t1 is h1=[h1[0], h1[1], . . . , h1[L−1]], and a CIR received by the STA at a moment t2 is h2=[h2[0], h2[1], . . . , h2[L−1]], where L represents a length of the CIR sequence. When the TRRS is lower than a preset threshold, it indicates that there is a great change between the two CIRs. In this case, CSI update and feedback need to be performed. The TRRS between h1 and h2 is calculated by (formula 2-1), and is denoted as $\eta(h_1, h_2)$:

$$\eta(h_1, h_2) = \frac{\max_i |(h_1 * g_2)[i]|}{\sqrt{\sum_{i=0}^{L-1} |h_1[i]|^2}\sqrt{\sum_{j=0}^{L-1} |g_2[j]|^2}}. \quad \text{(formula 2-1)}$$

g2=[g2[0], g2[1], . . . , g2[L−1]], which is obtained by performing time reversal and conjugation on h2·g2[k]=h*2 [L−1−k], where k=0, 1, . . . , L−1, and h*2 represents a conjugate of h2.

The evaluation algorithm 2 is a Mahalanobis distance (Mahalanobis distance, MD) algorithm. The Mahalanobis distance corrects inconsistency and correlation of dimensions in the Euclidean distance, and is used to evaluate similarity between data. The MD is used to measure similarity between two CIRs. A larger value of the MD indicates a greater difference between the two CIRs, that is, a greater change. A value range of the Mahalanobis distance is [0, +∞). Projection space of the Mahalanobis distance can be obtained by performing the following steps: rotating variables according to principal components, so that dimensions are independent of each other, and then performing normalizing to distribute the dimensions equally. It can be learned from a principal component analysis that because the principal component is an eigenvector direction, and a variance of each direction is a corresponding eigenvalue, it is only necessary to rotate according to the eigenvector direction, and then scale the eigenvalue by multiple.

For an area to be sensed, it is assumed that a CIR received by a STA during sensing measurement at a moment t1 is h1=[h1[0], h1[1], . . . , h1[L−1]], and a CIR received by the STA at a moment t2 is h2=[h2[0], h2[1], . . . , h2[L−1]]. When the MD is higher than a preset threshold, it indicates that there is a great change between the two CIRs. In this case, CSI update and feedback need to be performed.

The MD between h1 and h2 is calculated by (formula 2-2), and is denoted as $d(h_1, h_2)$:

$$d(h_1,h_2)=\sqrt{(h_1-h_2)^T\Sigma^{-1}(h_1-h_2)} \quad \text{(formula 2-2).}$$

$\Sigma=\mathrm{cov}(h_1, h_2)=E[(h_1-E[h_1])(h_2-E[h_2])^T]$ is a covariance matrix, where $E[h_1]$ represents an expectation of h1, and a superscript T represents a transposition of the matrix. The covariance matrix can display correlations between different dimensions and variances in each dimension at the same time. An element on a main diagonal is a variance (that is, energy) in each dimension, and another element is a covariance (that is, correlation) between two dimensions.

Information 4: a Feedback Suggestion Parameter

The information may be shown in Table 3, and includes but is not limited to at least one of the following types of information: a feedback type, a quantity of subcarriers in a subcarrier group, a quantity of bits of codebook information, a quantity of bits of CSI, or indication information indicating whether to perform further feedback.

TABLE 3

| | Information | Description |
|---|---|---|
| Feedback suggestion parameter | Feedback type | Feedback type of a channel measurement result |
| | A quantity of subcarriers in a subcarrier group | Size of a subcarrier group |

TABLE 3-continued

| Information | Description |
|---|---|
| A quantity of bits of codebook information | A quantity of bits occupied by codebook information after quantization |
| A quantity of bits of CSI | A quantity of bits occupied by CSI after quantization |
| Indication information indicating whether to perform further feedback | Whether a second communication apparatus wants to further feed back a result |

The following describes the feedback suggestion parameter in detail.

(1) A Feedback Type of a Feedback Result

This feedback suggestion parameter may indicate a feedback type of the channel measurement result. For example, the feedback type of the channel measurement result may be any one of the following: NDP, CSI, compressed CSI, or a sensing measurement result. Data volumes of channel measurement results of different feedback types may be different. For example, a data volume of the compressed CSI is different from a data volume of the CSI, and the data volume of the compressed CSI data is greater than the data volume of the CSI.

(2) A Quantity of Subcarriers in a Subcarrier Group

This feedback suggestion parameter may indicate a size of a subcarrier group, that is, how many subcarriers are included in a group. The quantity of subcarriers in the subcarrier group may be represented by using Ng. Ng may represent a grouping manner of subcarrier groups. Before grouping, each subcarrier may feed back one piece of CSI, and after grouping, a plurality of subcarriers in each subcarrier group may feed back one piece of CSI. Therefore, a size of CSI feedback can be reduced, and signaling overheads can be reduced.

(3) A Quantity of Bits of Codebook Information

This feedback suggestion parameter may indicate a quantity of bits occupied by codebook information after quantization, that is, a codebook size.

(4) A Quantity of Bits of CSI

This feedback suggestion parameter may indicate a quantity of bits occupied by CSI after quantization. For example, the CSI is a channel matrix, and the feedback suggestion parameter may indicate a quantity of bits occupied by each element in the channel matrix after quantization.

(5) Indication Information Indicating Whether to Further Feed Back

This feedback suggestion parameter may indicate whether the second communication apparatus wants to further feed back a result. For example, if the first communication apparatus receives indication information indicating that further feedback is required, the first communication apparatus may trigger the second communication apparatus that sends the indication information indicating that further feedback is required to send a feedback result. For another example, the first communication apparatus receives indication information indicating that no further feedback is required, and it indicates that the second communication apparatus does not want to further feed back (for example, when the second communication apparatus has not calculated the channel variation). In this case, the first communication apparatus may not trigger the second communication apparatus to send the feedback result.

Optionally, for the indication information indicating whether to further feed back, if the first communication apparatus notifies the second communication apparatus of specific information that needs to be fed back, for example, in the following, the first communication apparatus sends a second PPDU to the second communication apparatus, where the second PPDU includes third information to notify the second communication apparatus, refer to the following embodiment for details. Details are not described herein. In this case, the second communication apparatus may feed back the specific information that the first communication apparatus wants the second communication apparatus to feed back.

It should be noted that the first information may include any one of the foregoing information 1 to the foregoing information 4, or may include various combinations of the foregoing information 1 to the foregoing information 4, and information combinations performed based on specific situations in actual application fall within the protection scope of this application.

Further, the first information may be carried in the first PPDU in the following manner. For example, the first information in the first PPDU may include one or more type of the foregoing information 1 to information 4, and each type of information may be indicated by a corresponding bit.

Manner 1: The first information has only one form, and a length of the first information is fixed. To be specific, the first information indicates specific information in the information 1 to the information 4, a length of a bit indicating the specific information is fixed, and an arrangement and combination form between bits is also fixed. A fixed length facilitates reading, and can improve efficiency and accuracy of reading the first PPDU by the first communication apparatus. Optionally, a form and a length of the first PPDU are fixed.

Optionally, the first information in the first PPDU may include each type of the foregoing information 1 to information 4, the first information includes 24 bits, a $1^{st}$ bit to a $3^{rd}$ bit indicate one or more pieces of information in the information 1, a $4^{th}$ bit to a $10^{th}$ bit indicate one or more pieces of information in the information 2, an $11^{th}$ bit to a $19^{th}$ bit indicate one or more pieces of information in the information 3, and a $20^{th}$ bit to a $24^{th}$ bit indicate one or more pieces of information in the information 4. The second communication apparatus may set information that needs to be fed back to a first value (for example, 1), and set information that does not need to be fed back to a second value (for example, 0), where the first value and the second value are random, and the first value and the second value are different. Alternatively, the first communication apparatus may request the second communication apparatus to feed back one or more types of information in the information 1 to the information 4. The second communication apparatus may feed back information requested by the first communication apparatus by using a specific first value (for example, 1), and the second communication apparatus may not feed back information that is not requested by the first communication apparatus, or feed back the information that is not requested by the first communication apparatus by using any value (different from the first value) or a second value.

For example, information included in the first information may be indicated in a form of a bitmap, each bitmap may indicate one piece of information, and each bitmap may include one or more bits. A length of the bitmap may be fixed.

For example, the first PPDU may include second information, that is, whether the channel variation meets the preset condition (referred to as the channel variation for short), the first information in the first PPDU may include the CSI type for the channel variation calculation, the indication information indicating whether more measurements are required, and the feedback type, and the first PPDU may further include fourth information, that is, a channel variation degree. As shown in FIG. 8, in the first PPDU, the channel variation occupies one bit, the CSI type for the channel variation calculation is represented by using a CSI bitmap, and occupies three bits, the indication information indicating whether more measurements are required occupies one bit, the feedback type occupies one bit, the indication information indicating whether to further feed back occupies 1 bit, and the channel variation degree occupies 3 bits. A CSI type indicated by a 3-bit bitmap is determined, for example, each bit of 3 bits may separately represent CSI measured last time, average CSI, and flagged CSI. For example, the CSI type indicated by the 3-bit CSI bitmap is determined, and the 3 bits are 110. This indicates that the CSI type for the channel variation calculation includes the CSI measured last time and the average CSI, and does not include the flagged CSI. The first communication apparatus receives a CSI bitmap with 3 bits being 110, and may determine that the second communication apparatus calculates the channel variation by using the CSI measured last time and the average CSI. Optionally, in the CSI bitmap, a quantity of bits that are set to 1 may be limited to one or more, or may not be limited. For example, when only one bit can be set to 1, it indicates that when the second communication apparatus calculates the channel variation, only one type of CSI can be used. That a quantity of bits that are set to 1 is not limited indicates that a quantity of CSI types used when the second communication apparatus calculates the channel variation is not limited. Optionally, the first information in the first PPDU may have only a structure shown in FIG. 8, that is, the first information only indicates the CSI type for the channel variation calculation, the indication information indicating whether more measurements are required, and the feedback type. In addition, bits occupied by the CSI type for the channel variation calculation, the indication information indicating whether more measurements are required, and the feedback type can only be arranged and combined in a form shown in FIG. 8.

For another example, information included in the first information may be indicated in a form of an index (index). In a possible implementation, two bits are used to indicate four different types of information (or a combination of the four different types of information). In 2-bit indexes, 00 indicates that the channel variation meets the preset condition, 01 indicates that the CSI type for the channel variation calculation includes the CSI measured last time, 10 indicates that the CSI type for the channel variation calculation includes the average CSI, and 11 indicates that further feedback is required. It should be noted that the foregoing is merely an example. A quantity of bits of the index may not be limited to 2 bits, or may include more bits, and more information is indicated based on the more bits. Details are not described in this application.

Manner 2: Different modes correspond to different forms of the first information, that is, different modes represent corresponding to different first information. In this way, for each mode, information corresponding to the mode is carried. This further assists the first communication apparatus in selecting a second communication apparatus that sends the feedback result. Optionally, information carried in each mode is different. First PPDUs that carry different first information may be considered to be different.

For example, information corresponding to different modes may be carried by using different bitmaps or different indexes.

Figure 9:
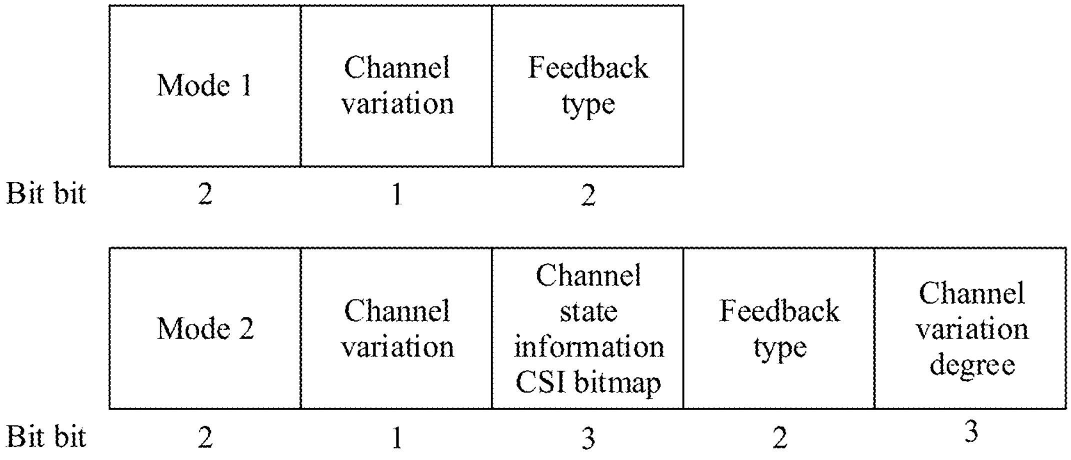
FIG. 9 is a schematic diagram of a structure of a PPDU frame according to an embodiment of this application.

For example, in a mode 1, the first PPDU includes indication information of the mode 1, the first information, and second information (the second information herein is the channel variation described above). In a mode 2, the first PPDU includes indication information of the mode 2, the first information, second information, and fourth information (the fourth information herein is the channel variation degree described above). The first information in the mode 1 is different from the first information in the mode 2. The first information in the mode 1 includes a feedback type, and the first information in the mode 2 includes a feedback type and a CSI type for channel variation calculation (the information is represented by using a CSI bitmap). As shown in FIG. 9, in the mode 1, the indication information of the mode 1 occupies 2 bits, the channel variation occupies 1 bit, and a feedback type of a feedback result occupies 2 bits. In the mode 2, the indication information of the mode 2 occupies 2 bits, the channel variation occupies 1 bit, the CSI bitmap occupies 3 bits, the feedback type occupies 2 bits, and the channel variation degree occupies 3 bits.

It should be noted that the foregoing mode 1 and the mode 2 are merely examples, and more other modes may be set based on a specific application with reference to this embodiment of this application. This is not limited in this application.

Manner 3: Whether the channel variation exceeds a preset variation threshold corresponds to different first information. Different first information corresponds to different first PPDUs. In this way, for whether the channel variation exceeds the preset variation threshold (that is, the second information in the foregoing description), corresponding first information is carried. This further assists the first communication apparatus in selecting a second communication apparatus that sends the feedback result. Optionally, whether the channel variation exceeds the preset variation threshold may also be considered as different modes.

For example, information corresponding to different modes may be carried by using different bitmaps or different indexes.

Figure 10:
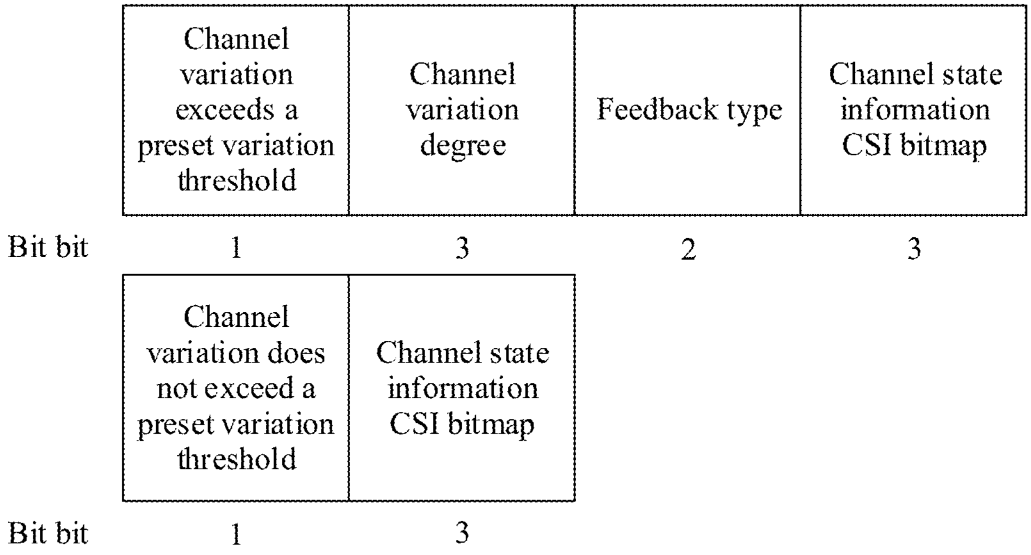
FIG. 10 is a schematic diagram of a structure of a PPDU frame according to an embodiment of this application.

For example, when the channel variation exceeds the preset variation threshold, the first PPDU includes indication information indicating that the channel variation exceeds the preset variation threshold, the first information, and the fourth information (the fourth information herein is the channel variation degree described above). When the channel variation does not exceed the preset variation threshold, the first PPDU includes indication information indicating that the channel variation does not exceed the preset variation threshold and the first information. When the channel variation exceeds the preset variation threshold, the first information includes a feedback type and a CSI type for channel variation calculation (the information is represented by using a CSI bitmap), and when the channel variation does not exceed the preset variation threshold, the first information includes a CSI bitmap. As shown in FIG. 10, when the channel variation exceeds the preset variation threshold, the indication information indicating that the channel variation exceeds the preset variation threshold occupies 1 bit, the channel variation degree occupies 3 bits, the feedback type occupies 2 bits, and the CSI bitmap occupies 3 bits. When the channel variation does not exceed the preset variation threshold, the indication information indicating that the channel variation does not exceed the preset variation threshold occupies 1 bit, and the CSI bitmap occupies 3 bits.

It may be understood that FIG. 8, FIG. 9, and FIG. 10 are merely examples of the first PPDU, and constitute no limitation on the first PPDU.

Manner 4: The first information may be carried based on an instruction of the first communication apparatus.

For example, the first communication apparatus sends a second PPDU, and the second communication apparatus receives the second PPDU, where the second PPDU includes third information, and the third information is used to request the first information or notify the first information.

In S702, the second communication apparatus may actively send the first PPDU to the first communication apparatus, or the second communication apparatus may send the first PPDU to the first communication apparatus based on the instruction of the first communication apparatus.

Optionally, the third information may include but is not limited to at least one of the following types of information: the CSI measurement quantity indication information required for channel variation calculation, the CSI type for the channel variation calculation, the information about the rule for the channel variation calculation, the feedback suggestion parameter, or indication information for clearing CSI.

The indication information for clearing CSI indicates the second communication apparatus to clear stored CSI. Optionally, for the second communication apparatus, CSI measured this time may be used as CSI measured for a first time, and CSI measured earlier than the CSI measured this time is not considered when the channel variation is calculated.

The third PPDU may be a feedback request (feedback request) in a reporting phase, or may be a frame sent before the feedback request, for example, may be a frame in a setup phase (setup phase) or a frame (for example, an NDPA) in a measurement phase.

Optionally, the third information is carried in a MAC frame of the third PPDU, that is, a data field of the third PPDU includes the MAC frame, and the MAC frame includes the first information. Alternatively, the third information is optionally carried in a PHY preamble of the third PPDU. Alternatively, the third information is optionally carried in a frame whose type is a trigger frame or a polling frame, for example, carried in a common information field (Common Info field) or a user information field (User Info field) of the trigger frame.

S703: The first communication apparatus determines, based on the first information in the first PPDU, whether to trigger a second communication apparatus to send the feedback result.

Optionally, in S703, the first communication apparatus may determine, based on the first information and the second information, whether to trigger the second communication apparatus to send the feedback result. Alternatively, the first communication apparatus may determine, based on the first information and the fourth information, whether to trigger the second communication apparatus to send the feedback result. Alternatively, the first communication apparatus may determine, based on the first information, the second information, and the fourth information, whether to trigger the second communication apparatus to send the feedback result.

In this step, the first communication apparatus not only determines, based on a result of whether the channel variation meets the preset condition, whether to trigger the second communication apparatus to send the feedback result, but further determines, based on the first information, whether the second communication apparatus sends the feedback result, and selects the second communication apparatus that sends the feedback result, to improve decision-making accuracy.

Optionally, the method provided in this embodiment of this application further includes S704: The first communication apparatus sends a second PPDU.

Correspondingly, the second communication apparatus receives the first PPDU. The second PPDU is used to trigger the second communication apparatus to send the feedback result.

The first communication apparatus may receive first PPDUs sent by one or more second communication apparatuses, and the first communication apparatus may select from, based on one or more first PPDUs, second communication apparatuses that trigger sending of the feedback result, and select a second communication apparatus that triggers sending of the feedback result. The first communication apparatus sends the second PPDU to the second communication apparatus that triggers sending of the feedback result, and does not send the second PPDU to a second communication apparatus that does not trigger sending of the feedback result.

The second PPDU may be or is similar to a feedback request frame, a feedback trigger frame, a polling frame, or the like.

In a possible case, if the first information includes information indicating that further feedback is not required (wanted), the first communication apparatus may not trigger the second communication apparatus to send the feedback result. That is, the second communication apparatus may not send the second PPDU.

Optionally, the method provided in this embodiment of this application further includes S705: The second communication apparatus sends the feedback result.

Correspondingly, the first communication apparatus receives the feedback result.

The feedback result may be a channel measurement result. Alternatively, the feedback result may be information indicating the first communication apparatus to measure a channel, that is, the first communication apparatus performs a processing process at a receiver or a responder, for example, performing channel measurement, sending a first PPDU, or sending a feedback result, and the second communication apparatus performs a processing process at a transmitter or an initiator, for example, triggering channel measurement, sending a second PPDU, and receiving a feedback result. In this way, the first communication apparatus does not need to wait for the second communication apparatus to feed back the channel measurement result, but performs channel measurement by the first communication apparatus, so that the channel measurement result can be obtained in a more timely manner. That is, the first communication apparatus and the second communication apparatus exchange roles.

The information indicating the first communication apparatus to measure a channel may be an NDP.

A second communication apparatus that receives the second PPDU sends the feedback result. Optionally, a second communication apparatus that does not receive the second PPDU may not send the feedback result, or the second communication apparatus may actively send the feedback result.

In this embodiment of this application, the first information is used to select the second communication apparatus that sends the feedback result. Therefore, the first communication apparatus may more accurately determine, based on the received first information, a second communication apparatus/second communication apparatuses to be triggered, and a triggered second communication apparatus/ triggered second communication apparatuses sends/send the feedback result. In this way, accuracy of channel measurement can be improved.

Figure 11:
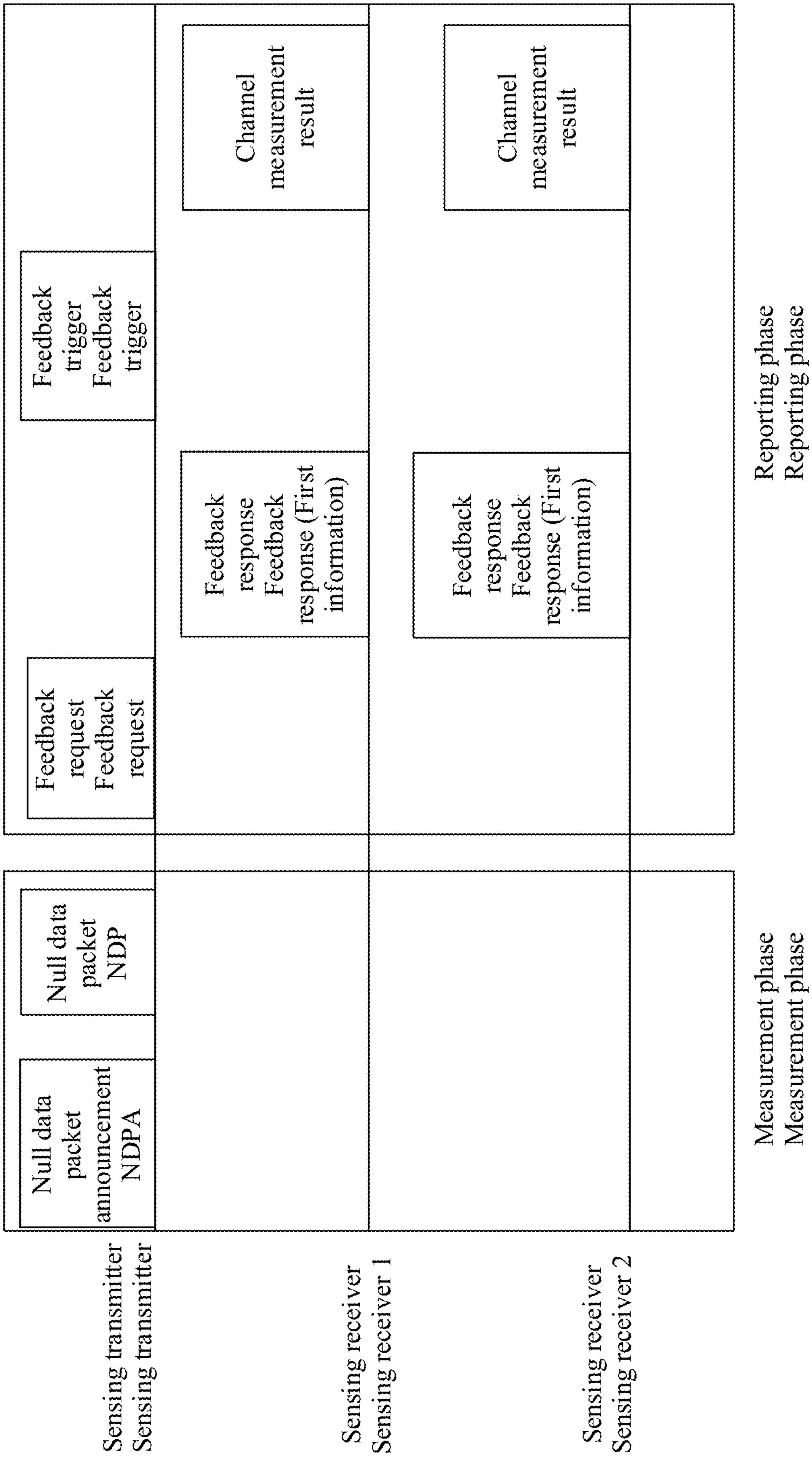
FIG. 11 is a schematic diagram of a sensing process according to an embodiment of this application.

FIG. 11 shows a possible sensing process according to an embodiment of this application. In a measurement phase, a transmitter sends an NDPA and an NDP to indicate one or more receivers to perform channel measurement. In a reporting phase, the transmitter sends a feedback request, to request to feed back a channel variation, a receiver 1 sends a feedback response, where the feedback response carries first information (of the receiver 1), and a receiver 2 sends a feedback response, where the feedback response carries first information (of the receiver 2). The transmitter may send a feedback trigger to both the receiver 1 and the receiver 2, and the receiver 1 and the receiver 2 return a channel measurement result. In FIG. 11, the transmitter selects, based on the first information, a receiver that sends a feedback result. This helps improve accuracy of channel measurement. Optionally, the feedback response of the receiver 2 carries Not Met information, and the receiver 2 may still be triggered to send a feedback result. This helps improve accuracy of channel measurement.

In the feedback method provided in this embodiment of this application, a first communication apparatus may send third information, the third information is used to request the first information or notify the first information, and the first information is used to select a second communication apparatus that sends the feedback result. Therefore, the first communication apparatus may more accurately determine a second communication apparatus/second communication apparatuses to be triggered, and a triggered second communication apparatus/triggered second communication apparatuses sends/send the feedback result, to improve accuracy of channel measurement.

Figure 12:
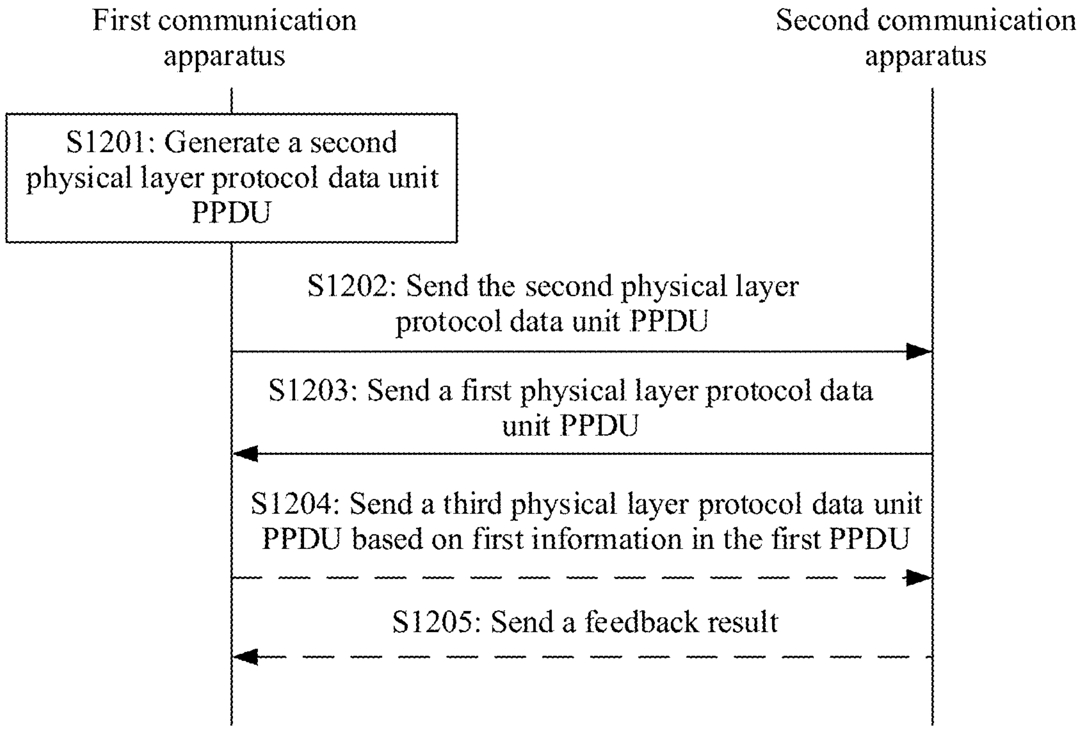
FIG. 12 is a schematic diagram of a feedback process according to an embodiment of this application.

FIG. 12 shows another feedback method according to an embodiment of this application. Similarities between FIG. 12 and FIG. 7 are not described again. The feedback method includes the following steps.

S1201: A first communication apparatus generates a second PPDU.

S1202: The first communication apparatus sends the second PPDU.

Correspondingly, a second communication apparatus receives the second PPDU.

The second PPDU includes third information, and the third information is used to request or notify first information. The first information is information related to channel measurement. Another type of information related to channel measurement, that is, the first information, is different from a channel measurement result and information indicating a channel variation.

For example, the second PPDU may be a feedback request in a reporting phase, or may be a frame sent before the feedback request, for example, may be a frame in a setup phase (setup phase) or a frame (for example, an NDPA) in a measurement phase.

Optionally, the third information is carried in a MAC frame of the second PPDU. Alternatively, the third information is optionally carried in a PHY preamble of the second PPDU. Alternatively, the third information is optionally carried in a frame whose type is a trigger frame or a polling frame, for example, carried in a common information field or a user information field of the trigger frame.

Optionally, the third information may include but is not limited to at least one of the following types of information: CSI measurement quantity indication information required for channel variation calculation, a CSI type for the channel variation calculation, information about a rule for the channel variation calculation, a feedback suggestion parameter, or indication information for clearing CSI.

The third information may be carried in the second PPDU in the following manner. For similarities, refer to the foregoing first PPDU. Details are not described herein again.

Manner 1: The third information has only one form, and a length of the third information is fixed. For example, the third information may be carried in a form of a bitmap or an index.

Manner 2: Different modes correspond to different forms of second PPDUs. For example, information corresponding to different modes may be carried by using different bitmaps or different indexes.

Manner 3: Different information may be carried based on whether a channel variation exceeds a preset variation threshold, that is, different information corresponds to different forms of second PPDUs. For example, information corresponding to different modes may be carried by using different bitmaps or different indexes.

Requesting the first information means requesting the second communication apparatus to feed back the first information. For the second communication apparatus, the third information means that the second communication apparatus needs to feed back the first information. However, a channel measurement process and a channel measurement result of the second communication apparatus are not affected. The first communication apparatus may selectively trigger, based on the first information fed back by the second communication apparatus, the second communication apparatus that sends the first information, to improve decision-making accuracy. For example, the first communication apparatus considers that a channel variation calculated based on CSI measured for a first time can better meet a currently required channel measurement requirement (for example, measuring an object that moves slowly). The first communication apparatus wants to determine whether the second communication apparatus uses the CSI measured for a first time when the second communication apparatus calculates the channel variation, and the first communication apparatus may request that a CSI type for channel variation calculation is the CSI measured for a first time. Then, the second communication apparatus feeds back whether the CSI type for the channel variation calculation is the CSI measured for a first time. For example, when the CSI type for the channel variation calculation is the CSI measured for a first time, a value of one bit of the CSI used for the channel variation calculation is 1, and when the CSI type for the channel variation calculation is not the CSI measured for a first time, one bit of the CSI measured for a first time is 0.

Notifying the first information means notifying the second communication apparatus of the first information. For the second communication apparatus, notifying the first information may affect an input parameter and/or an output parameter used by the second communication apparatus to calculate the channel variation, and may further affect the channel variation calculated by the second communication apparatus. Therefore, the second communication apparatus may calculate a more accurate channel variation. The first communication apparatus may more accurately determine, at the channel variation, whether to trigger the second communication apparatus to send a feedback result. For example, the first communication apparatus considers that the channel variation calculated based on CSI measured for a first time can better meet a currently required channel measurement requirement (for example, measuring an object that moves slowly), and the first communication apparatus may notify that a CSI type for channel variation calculation is the CSI measured for a first time. Then, the second communication apparatus calculates the channel variation based on the CSI measured for a first time. Optionally, a CSI type for the channel variation calculation fed back by the second communication apparatus is the CSI measured for a first time.

Optionally, information that is in the third information and that is used to request or notify information related to channel measurement may be shown in Table 4.

TABLE 4

| | Information |
|---|---|
| CSI measurement quantity indication information required for channel variation calculation | A second communication apparatus needs to feed back whether more measurements are required |
| | A second communication apparatus needs to feed back a total quantity of measurements |
| | A second communication apparatus needs to feed back a remaining quantity of measurements |
| | Inform a second communication apparatus of whether more measurements are required |
| | Inform a second communication apparatus of a total quantity of measurements |
| | Inform a second communication apparatus of a remaining quantity of measurements |
| CSI type for channel variation calculation | A second communication apparatus needs to feed back whether a CSI type for channel variation calculation is CSI measured this time |
| | A second communication apparatus needs to feed back whether a CSI type for channel variation calculation is CSI whose measurement moment exceeds a specified time threshold |
| | A second communication apparatus needs to feed back whether a CSI type for channel variation calculation is CSI whose quantity of measurements exceeds a specified quantity threshold |
| | A second communication apparatus needs to feed back whether a CSI type for channel variation calculation is CSI measured last time |
| | A second communication apparatus needs to feed back whether a CSI type for channel variation calculation is CSI measured for a first time |
| | A second communication apparatus needs to feed back whether a CSI type for channel variation calculation is average CSI |
| | A second communication apparatus needs to feed back whether a CSI type for channel variation calculation is numbered CSI |
| | A second communication apparatus needs to feed back whether a CSI type for channel variation calculation is flagged CSI |
| | Inform a second communication apparatus to calculate a channel variation based on CSI measured this time |
| | Inform a second communication apparatus to calculate a channel variation based on CSI whose measurement moment exceeds a specified time threshold |
| | Inform a second communication apparatus to calculate a channel variation based on CSI whose quantity of measurements exceeds a specified quantity threshold |
| | Inform a second communication apparatus to calculate a channel variation based on CSI measured last time |
| | Inform a second communication apparatus to calculate a channel variation based on CSI measured for a first time |
| | Inform a second communication apparatus to calculate a channel variation based on average CSI |
| | Inform a second communication apparatus to calculate a channel variation based on CSI corresponding to a number |

TABLE 4-continued

| | Information |
|---|---|
| | Inform a second communication apparatus to calculate a channel variation based on flagged CSI |
| Information about a rule for channel variation calculation | A second communication apparatus needs to feed back whether a rule for channel variation calculation is an indicated rule |
| | Inform a second communication apparatus to calculate a channel variation according to an indicated rule |
| Suggestion parameter of a feedback result | A second communication apparatus needs to feed back a suggested feedback type |
| | A second communication apparatus needs to feed back a quantity of subcarriers in a subcarrier group |
| | A second communication apparatus needs to feed back a quantity of bits of codebook information |
| | A second communication apparatus needs to feed back a quantity of bits of CSI |
| | A second communication apparatus needs to feed back information indicating whether the second communication apparatus needs (wants) to further feed back |
| | Inform a second communication apparatus of a suggested feedback type |
| | Inform a second communication apparatus of a quantity of subcarriers in a subcarrier group |
| | Inform a second communication apparatus of a quantity of bits of codebook information |
| | Inform a second communication apparatus of a quantity of bits of CSI |
| | Inform a second communication apparatus of indication information indicating whether the second communication apparatus needs (wants) to further feed back |
| Indication information for clearing CSI | Inform indication information for clearing CSI |

S1203: The second communication apparatus sends a first PPDU.

Correspondingly, the first communication apparatus receives the first PPDU.

Optionally, the second communication apparatus may feed back the first PPDU in an existing feedback manner. For example, the first PPDU includes only whether the channel variation exceeds a preset variation threshold.

Alternatively, the second communication apparatus may feed back the first PPUD in a new feedback manner. The first PPDU may include the first information. Optionally, the first information may include but is not limited to at least one of the following types of information: CSI measurement quantity indication information required for channel variation calculation, a CSI type for the channel variation calculation, information about a rule for the channel variation calculation, or a feedback suggestion parameter.

For example, if the third information is used to request the first information, the second communication apparatus needs to add the requested first information to the first PPDU. For example, if the CSI type that is used for the channel variation calculation and that is requested by the third information is CSI measured for a first time, the second communication apparatus adds the CSI measured for a first time to the first information of the first PPDU. If the second communication apparatus calculates the channel variation based on the CSI measured for a first time, a value of one bit of the CSI measured for the first time in the first information is 1. If the second communication apparatus does not calculate the channel variation based on the CSI measured for a first time, a value of a bit of the CSI measured for a first time in the first information is 0. In this way, the first communication apparatus may determine, based on the first information, whether the second communication apparatus calculates the channel variation by using the CSI measured for a first time.

For example, if the third information is used to notify the first information, the second communication apparatus does not need to add the notified first information to the first PPDU. For example, if the third information notifies that a CSI type for channel variation calculation is CSI measured for a first time, the second communication apparatus calculates the channel variation based on the CSI measured for a first time. In this case, the second communication apparatus may add the CSI measured for a first time to the first information. Alternatively, the second communication apparatus may not add the CSI measured for a first time in the first information, or even the second communication apparatus may not feed back the first information, for example, feed back only the first information.

Optionally, the method provided in this embodiment of this application further includes S1204: The first communication apparatus sends a third PPDU based on the first information in the first PPDU.

Correspondingly, the second communication apparatus receives the third PPDU.

Optionally, the method provided in this embodiment of this application further includes S1205: The second communication apparatus sends the feedback result.

Correspondingly, the first communication apparatus receives the feedback result.

A second communication apparatus that receives the third PPDU may send the feedback result. Optionally, a second communication apparatus that does not receive the third PPDU may not send the feedback result, or may actively send the feedback result. For a specific process, refer to FIG. 7. Similarities are not described again.

In this embodiment of this application, the first communication apparatus may send the third information, the third information may be used to request the first information or notify the first information, and the first information is used to select a second communication apparatus that sends the feedback result. Therefore, the first communication apparatus may more accurately determine a second communication apparatus/second communication apparatuses to be triggered, and a triggered second communication apparatus/triggered second communication apparatuses sends/send the feedback result, to improve accuracy of channel measurement.

Figure 13:
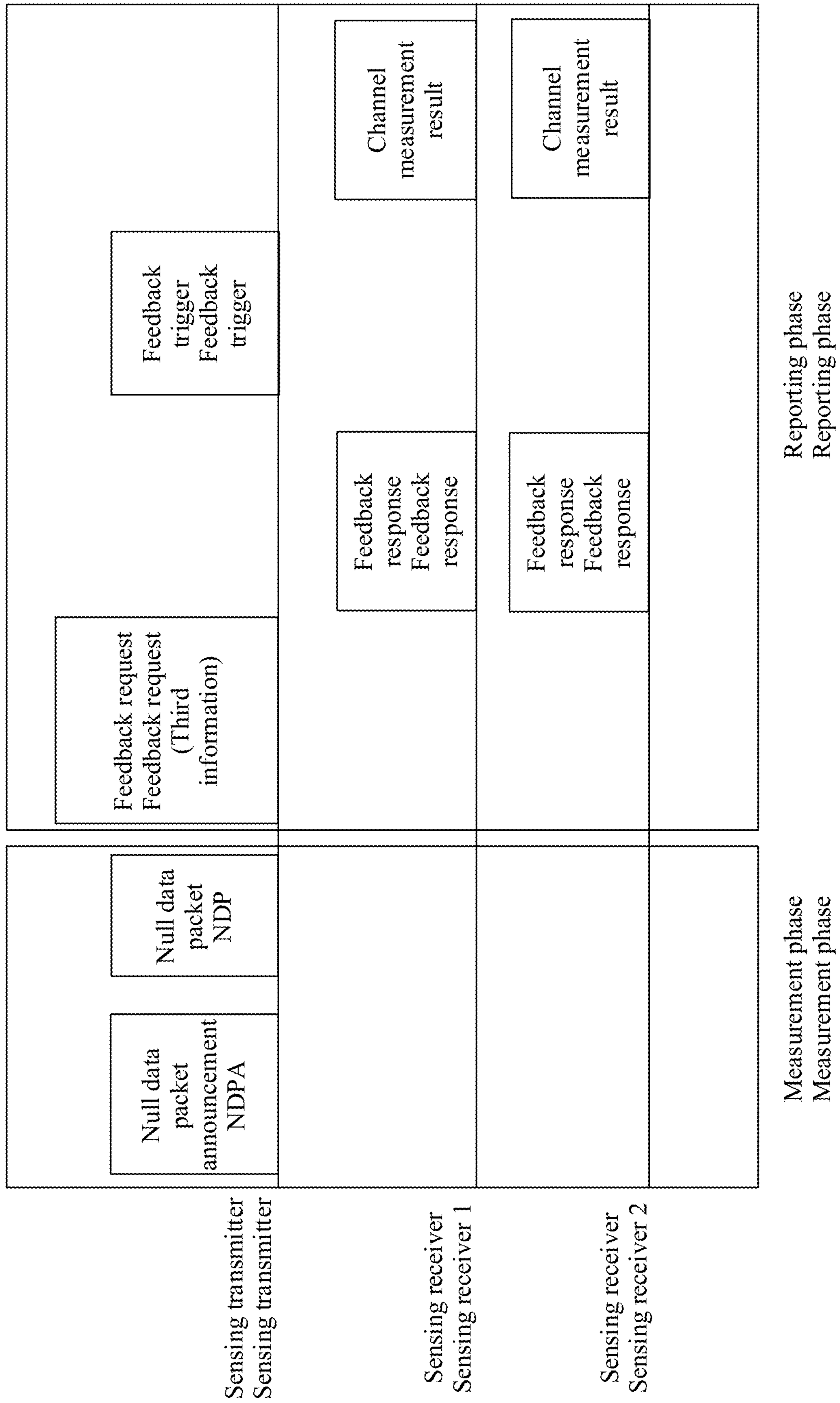
FIG. 13 is a schematic diagram of a sensing process according to an embodiment of this application.

FIG. 13 shows a possible sensing process according to an embodiment of this application. In a measurement phase, a transmitter sends an NDPA and an NDP to indicate one or more receivers to perform channel measurement. In a reporting phase, the transmitter sends a feedback request, where the feedback request t includes third information. A receiver 1 and a receiver 2 send a feedback response. The transmitter may send a feedback trigger to both the receiver 1 and the receiver 2, and the receiver 1 and the receiver 2 return a channel measurement result. In FIG. 13, the transmitter selects, based on first information, a receiver that sends a feedback result. This helps improve accuracy of channel measurement. Optionally, even if the feedback response of the receiver 2 carries Not Met information, the receiver 2 may still be triggered to send a feedback result. This helps improve accuracy of channel measurement.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

It may be understood that, in the foregoing embodiments, a method and/or a step implemented by the first communication apparatus may also be implemented by a component (for example, a chip or a circuit) that can be used in the first communication apparatus, and a method and/or a step implemented by the second communication apparatus may also be implemented by a component that can be used in the second communication apparatus.

In the foregoing embodiments provided in this application, the methods provided in embodiments of this application are separately described from a perspective of interaction between the first communication apparatus and the second communication apparatus. To implement functions in the methods provided in embodiments of this application, the first communication apparatus and the second communication apparatus may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The following describes, with reference to the accompanying drawings, a communication apparatus for implementing the foregoing method in embodiments of this application. Therefore, all the foregoing content may be used in the following embodiments. Repeated content is not described again.

Figure 14:
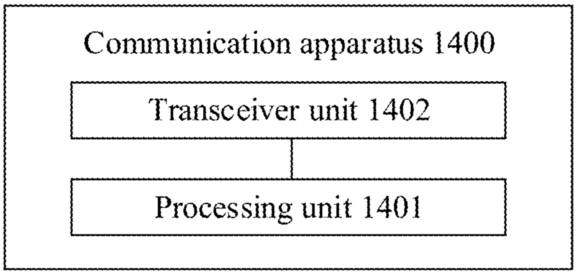
FIG. 14 is a schematic diagram of a structure of a communication apparatus according to an embodiment of this application.

FIG. 14 is a possible representation form of a communication apparatus according to an embodiment of this application. A communication apparatus 1400 may be configured to implement functions or steps implemented by the first communication apparatus or the second communication apparatus in the foregoing method embodiments. Optionally, the communication apparatus may include a processing unit 1401 and a transceiver unit 1402. Optionally, the communication apparatus may further include a storage unit. The storage unit may be configured to store instructions (code or a program) and/or data. The processing unit 1401 and the transceiver unit 1402 may be coupled to the storage unit. For example, the processing unit 1401 may read the instructions (the code or the program) and/or the data in the storage unit, to implement a corresponding method. The foregoing units may be independently disposed, or may be partially or completely integrated.

In some possible implementations, the communication apparatus 1400 can correspondingly implement behavior and functions of the first communication apparatus in the foregoing method embodiments. For example, the communication apparatus 1400 may be an AP, or may be a component (for example, a chip or a circuit) used in the AP. The transceiver unit 1402 may be configured to perform all receiving or sending operations performed by the first communication apparatus in the embodiment shown in FIG. 7 or FIG. 12. For example, the transceiver unit 1402 may perform S701 in the embodiment shown in FIG. 7, and/or may be configured to support another process in a technology described in this specification. The processing unit 1401 is configured to perform all operations performed by the first communication apparatus in the embodiment shown in FIG. 7 or FIG. 12 other than sending and receiving operations. For example, the processing unit 1401 may generate the second PPDU in S702 in the embodiment shown in FIG. 7, and/or may be configured to support another process in the technology described in this specification.

For example, the transceiver unit 1402 is configured to receive a first PPDU, where the first PPDU includes first information, and the first information includes at least one of the following types of information: CSI measurement quantity indication information required for channel variation calculation, a CSI type for the channel variation calculation, information about a rule for the channel variation calculation, or a feedback suggestion parameter, where the feedback suggestion parameter indicates a suggested feedback form.

The processing unit 1401 is configured to determine, based on the first information, whether to trigger a second communication apparatus to send a feedback result.

Optionally, the transceiver unit 1402 is further configured to send a second PPDU, where the second PPDU includes third information, and the third information is used to request the first information or notify the first information.

In some possible implementations, the communication apparatus 1400 can correspondingly implement behavior and functions of the second communication apparatus in the foregoing method embodiments. For example, the communication apparatus 1400 may be a STA, or may be a component (for example, a chip or a circuit) used in the STA. The transceiver unit 1402 may be configured to perform all receiving or sending operations performed by the second communication apparatus in the embodiment shown in FIG. 7 or FIG. 12. For example, the transceiver unit 1402 may perform S701 in the embodiment shown in FIG. 7, and/or may be configured to support another process in a technology described in this specification. The processing unit 1401 is configured to perform all operations performed by the second communication apparatus in the embodiment shown in FIG. 7 or FIG. 12 other than sending and receiving operations. For example, the processing unit may generate the first PPDU in S701 in the embodiment shown in FIG. 7, and/or may be configured to support another process in the technology described in this specification.

For example, the processing unit 1401 is configured to generate a first PPDU, where the first PPDU includes the first information, and the first information includes at least one of the following types of information: CSI measurement quantity indication information required for channel variation calculation, a CSI type for the channel variation calculation, information about a rule for the channel variation calculation, or a feedback suggestion parameter, where the feedback suggestion parameter indicates a suggested feedback form.

The transceiver unit 1402 is configured to send the first PPDU.

Optionally, the transceiver unit 1402 is further configured to receive a second PPDU, where the second PPDU includes third information, and the third information is used to request the first information or notify the first information.

In an optional manner, the third information includes at least one of the following types: the CSI measurement quantity indication information required for the channel variation calculation, the CSI type for the channel variation calculation, the information about the rule for the channel variation calculation, the feedback suggestion parameter, or indication information for clearing CSI.

In an optional manner, the first PPDU further includes second information, and the second information indicates whether a channel variation exceeds a specified variation threshold.

In an optional manner, the CSI measurement quantity indication information required for the channel variation calculation includes at least one of the following types: indication information indicating whether more measurements are required, a total quantity of measurements, or a remaining quantity of measurements.

In an optional manner, the CSI type for the channel variation calculation includes at least one of the following types: CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

In an optional manner, the feedback suggestion parameter includes at least one of the following types: a feedback type, a quantity of subcarriers in a subcarrier group, a quantity of bits of codebook information, or a quantity of bits of CSI.

In an optional manner, the first information is carried in a MAC frame of the first PPDU, or the first information is carried in a PHY preamble of the first PPDU.

It should be noted that the communication apparatus 1400 may be configured to perform the foregoing method embodiments. For specific steps, descriptions, and corresponding beneficial effects, refer to the foregoing method embodiments. Details are not described herein again.

It should be understood that the processing unit 1401 in this embodiment of this application may be implemented by a processor/processing circuit or a circuit component related to the processor/processing circuit, and the transceiver unit 1402 may be implemented by a transceiver/transceiver interface or a circuit component related to the transceiver/transceiver interface or a communication interface.

Figure 15:
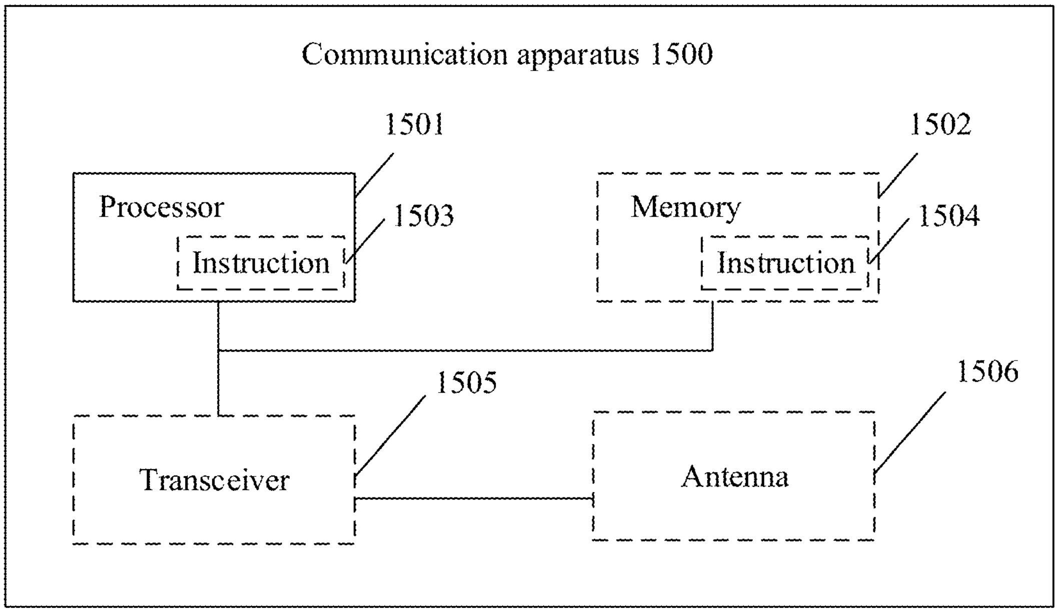
FIG. 15 is a schematic diagram of a structure of a communication apparatus according to an embodiment of this application.

FIG. 15 is a possible representation form of a communication apparatus according to an embodiment of this application. A communication apparatus 1500 may include a processor 1501 and a transceiver 1505, and optionally, further includes a memory 1502. The communication apparatus may be used as an apparatus for sending a trigger frame and a PPDU in this application, or may be used as an apparatus for receiving a trigger frame and a PPDU in this application.

The transceiver 1505 may be referred to as a transceiver unit, a transceiver machine, a transceiver circuit, or the like, and is configured to implement a transceiver function. The transceiver 1505 may include a receiver machine and a transmitter machine. The receiver machine may be referred to as a receiver, a receiver circuit, or the like, and is configured to implement a receiving function. The transmitter machine may be referred to as a transmitter, a transmitter circuit, or the like, and is configured to implement a sending function.

The memory 1502 may store a computer program, software code, or instructions 1504, and the computer program, the software code, or the instructions 1504 may also be referred to as firmware. The processor 1501 may control a MAC layer and a PHY layer by running the computer program, the software code, or the instructions 1503, or by invoking the computer program, the software code, or the instructions 1504 stored in the memory 1502, to implement a PPDU transmission method provided in the following embodiments of this application. The processor 1501 may be a central processing unit (central processing unit, CPU), and the memory 1502 may be, for example, a read-only memory (read-only memory, ROM) or a random access memory (random access memory, RAM).

The processor 1501 and the transceiver 1505 described in this application may be implemented in an integrated circuit (integrated circuit, IC), an analog IC, a radio frequency integrated circuit RFIC, a mixed signal IC, an application-specific integrated circuit (application-specific integrated circuit, ASIC), a printed circuit board (printed circuit board, PCB), an electronic device, and the like.

The communication apparatus 1500 may further include an antenna 1506. Modules included in the communication apparatus 1500 are merely examples for description. This is not limited in this application.

As described above, the communication apparatus 1500 described in the foregoing embodiment may be an AP or a STA. However, a scope of the communication apparatus described in this application is not limited thereto, and a structure of the communication apparatus may not be limited to a structure in FIG. 15.

The AP may be an AP with a plurality of antennas/radio frequencies, or may be an AP with a single antenna/radio frequency, and the antenna/radio frequency is configured to send/receive a data packet. In an implementation, an antenna or a radio frequency part of the AP may be separated from a main body of the AP, that is, may be remotely disposed. In an implementation, the STA may be a STA with a single antenna/radio frequency, may be a STA with a plurality of antennas/radio frequencies, and may be a device having more than two antennas. The antenna/radio frequency is configured to send/receive a data packet. In an implementation, an antenna or a radio frequency part of the STA may be separated from a main body of the STA, that is, may be remotely disposed.

Alternatively, the communication apparatus in this application may be an independent device or may be a part of a larger device. For example, the communication apparatus may be implemented in the following forms:

(1) an independent integrated circuit IC, a chip, a chip system, or a subsystem; (2) a set including one or more ICs, and optionally, the IC set may include a storage component for storing data and instructions; (3) a module that can be embedded in another device; (4) a receiver, an intelligent terminal, a wireless device, a handheld device, a mobile unit, a vehicle-mounted device, a cloud device, an artificial intelligence device, or the like; or (5) others.

Figure 16:
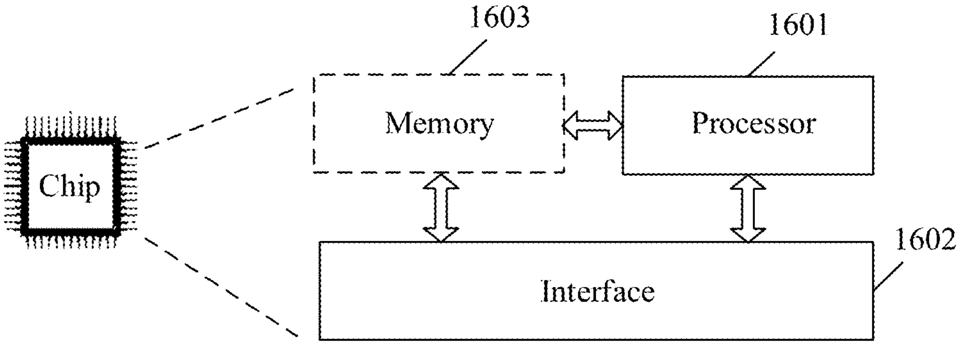
FIG. 16 is a schematic diagram of a structure of a communication apparatus according to an embodiment of this application.

When the communication apparatus is implemented in a form of the chip or the chip system, refer to a schematic diagram of a structure of a chip shown in FIG. 16. The chip shown in FIG. 16 includes a processor 1601 and an interface 1602. There may be one or more processors 1601, and there may be a plurality of interfaces 1602. The interface 1602 is configured to receive and send a signal. Optionally, the chip or the chip system may include a memory 1603. The memory 1603 is configured to store program instructions and data that are necessary for the chip or the chip system.

Embodiments of this application do not limit the protection scope and applicability of the claims. A person skilled in the art may adaptively change functions and deployments of elements in this application, or omit, replace, or add various processes or components as appropriate without departing from the scope of embodiments of this application.

An embodiment of this application further provides a computer-readable storage medium. The computer-readable storage medium stores a computer program. When the computer-readable storage medium is executed by a computer, functions of the foregoing method embodiments are implemented.

An embodiment of this application further provides a computer program product. When the computer program product is executed by a computer, functions of the foregoing method embodiments are implemented.

An embodiment of this application further provides a chip system. The chip system includes a processor and an interface, configured to support a communication transmission device in implementing a function of an access point or a station in the foregoing method embodiments, for example, determining or processing at least one of data and information in the foregoing methods. In a possible design, the chip system further includes a memory, and the memory is configured to store information and data that are necessary for the foregoing communication apparatus. The chip system may include a chip, or may include a chip and another discrete component.

An embodiment of this application provides a functional entity. The functional entity is configured to implement the foregoing feedback method.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether these functions are performed in hardware or software depends on particular applications and design constraints of the technology solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A feedback method, comprising:

receiving, by a first communication apparatus, a first physical layer protocol data unit (PPDU), wherein the first PPDU comprises first information, wherein the first information comprises at least one of channel state information (CSI) measurement quantity indication information for channel variation calculation, a CSI type for the channel variation calculation, information about a rule for the channel variation calculation, or a feedback suggestion parameter, and wherein the feedback suggestion parameter indicates a suggested feedback form; and determining, by the first communication apparatus based on the first information, whether to trigger a second communication apparatus to send a feedback result, wherein the second communication apparatus is different from the first communication apparatus.

2. The method according to claim 1, wherein the first PPDU further comprises fourth information, and the fourth information indicates a channel variation degree.

3. The method according to claim 1, wherein the first PPDU further comprises second information, and the second information indicates whether a channel variation exceeds a specified variation threshold.

4. The method according to claim 1, wherein before receiving, by the first communication apparatus, the first PPDU, the method further comprises:

sending, by the first communication apparatus, a second PPDU, wherein the second PPDU comprises third information, and the third information is used to request the first information or to notify the first information.

5. The method according to claim 4, wherein the third information comprises at least one of the CSI measurement quantity indication information for the channel variation calculation, the CSI type for the channel variation calculation, the information about the rule for the channel variation calculation, the feedback suggestion parameter, or indication information for clearing CSI.

6. The method according to claim 1, wherein the CSI measurement quantity indication information for the channel variation calculation comprises at least one of indication information indicating whether more measurements are required, a total quantity of measurements, or a remaining quantity of measurements.

7. The method according to claim 1, wherein the CSI type for the channel variation calculation comprises at least one of CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

8. The method according to claim 1, wherein the feedback suggestion parameter comprises at least one of a feedback type, a quantity of subcarriers in a subcarrier group, a quantity of bits of codebook information, or a quantity of bits of CSI.

9. A feedback method, comprising:

generating, by a second communication apparatus, a first physical layer protocol data unit (PPDU), wherein the first PPDU comprises first information, wherein the first information comprises at least one of channel state information (CSI) measurement quantity indication information for channel variation calculation, a CSI type for the channel variation calculation, information about a rule for the channel variation calculation, or a feedback suggestion parameter, and wherein the feedback suggestion parameter indicates a suggested feedback form; and sending, by the second communication apparatus, the first PPDU to a first communication apparatus, wherein the second communication apparatus is different from the first communication apparatus, and the first information is used by the first communication apparatus to determine whether to trigger the second communication apparatus to send a feedback result.

10. The method according to claim 9, wherein the first PPDU further comprises fourth information, and the fourth information indicates a channel variation degree.

11. The method according to claim 9, wherein the first PPDU further comprises second information, and the second information indicates whether a channel variation exceeds a specified variation threshold.

12. The method according to claim 9, wherein before sending, by the second communication apparatus, the first PPDU, the method further comprises:

receiving, by the second communication apparatus, a second PPDU, wherein the second PPDU comprises third information, and the third information is used to request the first information or to notify the first information.

13. The method according to claim 12, wherein the third information comprises at least one of the CSI measurement quantity indication information for the channel variation calculation, the CSI type for the channel variation calculation, the information about the rule for the channel variation calculation, the feedback suggestion parameter, or indication information for clearing CSI.

14. The method according to claim 9, wherein the CSI measurement quantity indication information for the channel variation calculation comprises at least one of indication information indicating whether more measurements are required, a total quantity of measurements, or a remaining quantity of measurements.

15. The method according to claim 9, wherein the CSI type for the channel variation calculation comprises at least one of CSI measured this time, CSI whose measurement moment exceeds a specified time threshold, CSI whose quantity of measurements exceeds a specified quantity threshold, CSI measured last time, CSI measured for a first time, average CSI, numbered CSI, or flagged CSI.

16. The method according to claim 9, wherein the feedback suggestion parameter comprises at least one of a feedback type, a quantity of subcarriers in a subcarrier group, a quantity of bits of codebook information, or a quantity of bits of CSI.

17. A communication apparatus, comprising:

at least one processor; and at least one memory coupled to the at least one processor and storing programming instructions for execution by the at least one processor to perform operations comprising:

receiving a first physical layer protocol data unit (PPDU), wherein the first PPDU comprises first information, wherein the first information comprises at least one of channel state information (CSI) measurement quantity indication information for channel variation calculation, a CSI type for the channel variation calculation, information about a rule for the channel variation calculation, or a feedback suggestion parameter, and wherein the feedback suggestion parameter indicates a suggested feedback form; and determining, based on the first information, whether to trigger a second communication apparatus to send a feedback result, wherein the second communication apparatus is different from the communication apparatus.

18. The communication apparatus according to claim 17, wherein the first PPDU further comprises fourth information, and the fourth information indicates a channel variation degree.

19. The communication apparatus according to claim 17, wherein the first PPDU further comprises second information, and the second information indicates whether a channel variation exceeds a specified variation threshold.

20. The method according to claim 1, wherein determining, by the first communication apparatus based on the first information, whether to trigger the second communication apparatus to send the feedback result comprises:

determining a plurality of second communication apparatuses; and selecting, based on the first information, the second communication apparatus from the plurality of second communication apparatuses.

* * * * *